United States Patent [19]

Aoki

[11] Patent Number: 5,117,309

[45] Date of Patent: May 26, 1992

[54] VARI-FOCAL LENS SYSTEM HAVING GRADED REFRACTIVE INDEX LENS

[75] Inventor: Norihiko Aoki, Tokyo, Japan

[73] Assignee: Olympus Optical Co., Ltd., Tokyo, Japan

[21] Appl. No.: 537,780

[22] Filed: Jun. 14, 1990

[30] Foreign Application Priority Data

Jun. 15, 1989 [JP] Japan ................................. 1-150588
Feb. 20, 1990 [JP] Japan ................................. 2-37391

[51] Int. Cl.[5] .................... G02B 15/14; G02B 13/18
[52] U.S. Cl. ..................................... 359/654; 359/686; 359/687; 359/688; 359/689; 359/708
[58] Field of Search ............... 350/423, 426, 427, 428, 350/413; 359/654, 686, 687, 688, 689, 708

[56] References Cited

U.S. PATENT DOCUMENTS

| 4,776,697 | 10/1988 | Kamrat | 356/336 |
| 4,842,386 | 6/1989 | Kitagishi et al. | 350/427 |
| 4,859,040 | 8/1989 | Kitagishi et al. | 350/713 |

FOREIGN PATENT DOCUMENTS

| 61-126515 | 6/1986 | Japan . |
| 61-138913 | 6/1986 | Japan . |
| 61-148414 | 7/1986 | Japan . |
| 61-295524 | 12/1986 | Japan . |
| 63-159818 | 7/1988 | Japan . |
| 63-161423 | 7/1988 | Japan . |

Primary Examiner—Scott J. Sugarman
Attorney, Agent, or Firm—Cushman, Darby & Cushman

[57] ABSTRACT

A compact vari-focal lens system having a high vari-focal ratio, comprising a plurality of lens units including at least one lens unit having a positive refractive power and at least one lens unit having a negative refractive power, and adapted so as to change focal length thereof by moving one of said lens units along the optical axis, the lens unit arranged on the extremely object in said lens system having a positive refractive power and at least one radial GRIN lens being used in a negative lens unit.

34 Claims, 25 Drawing Sheets

FIG. 1

FIG. 1
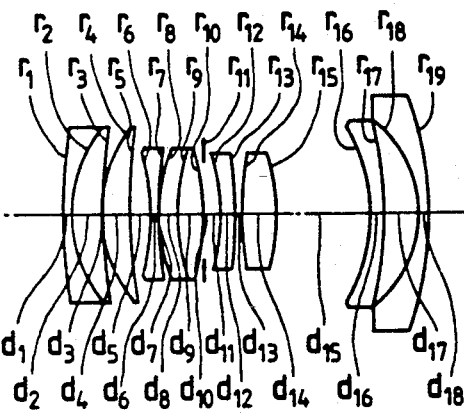
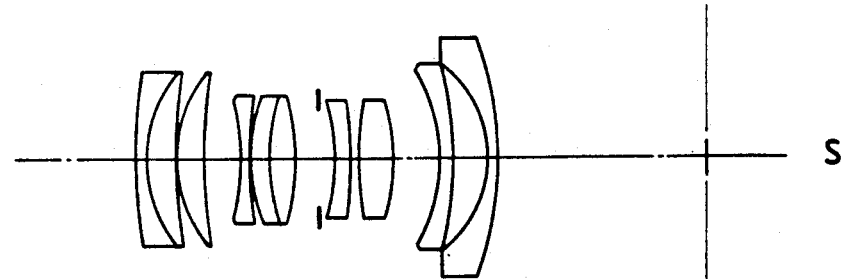
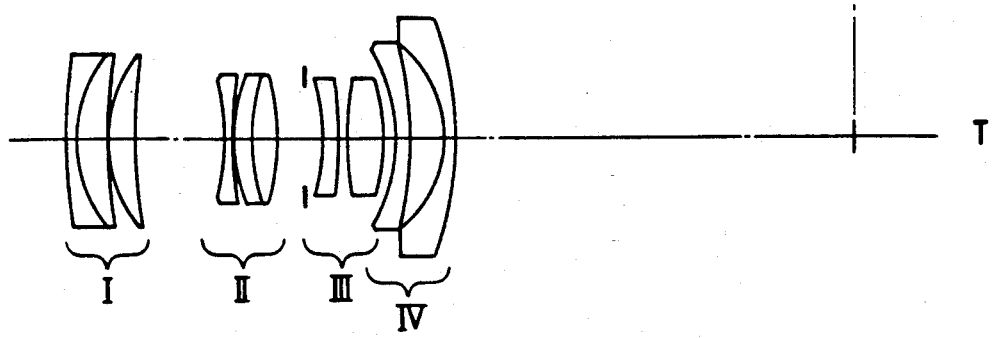

FIG. 7
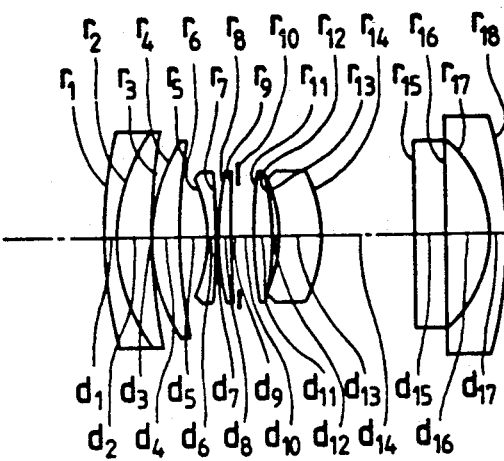
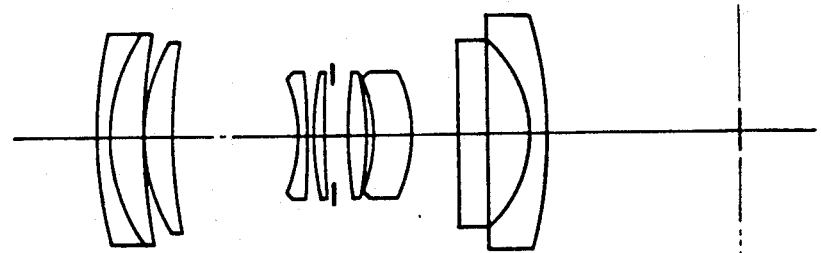
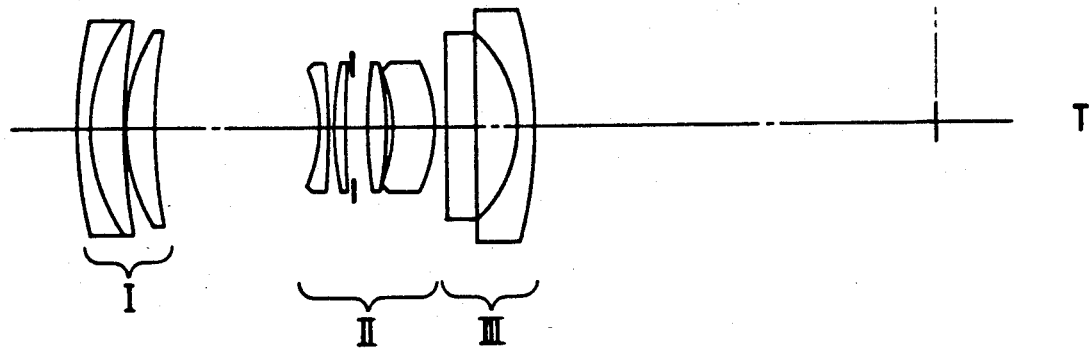

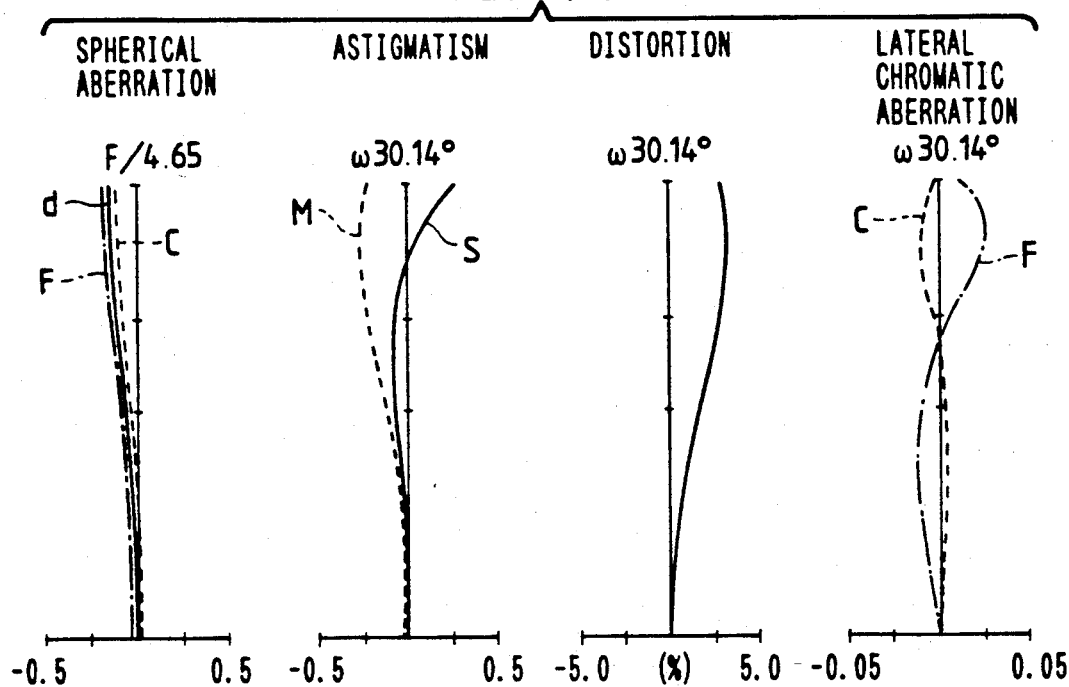
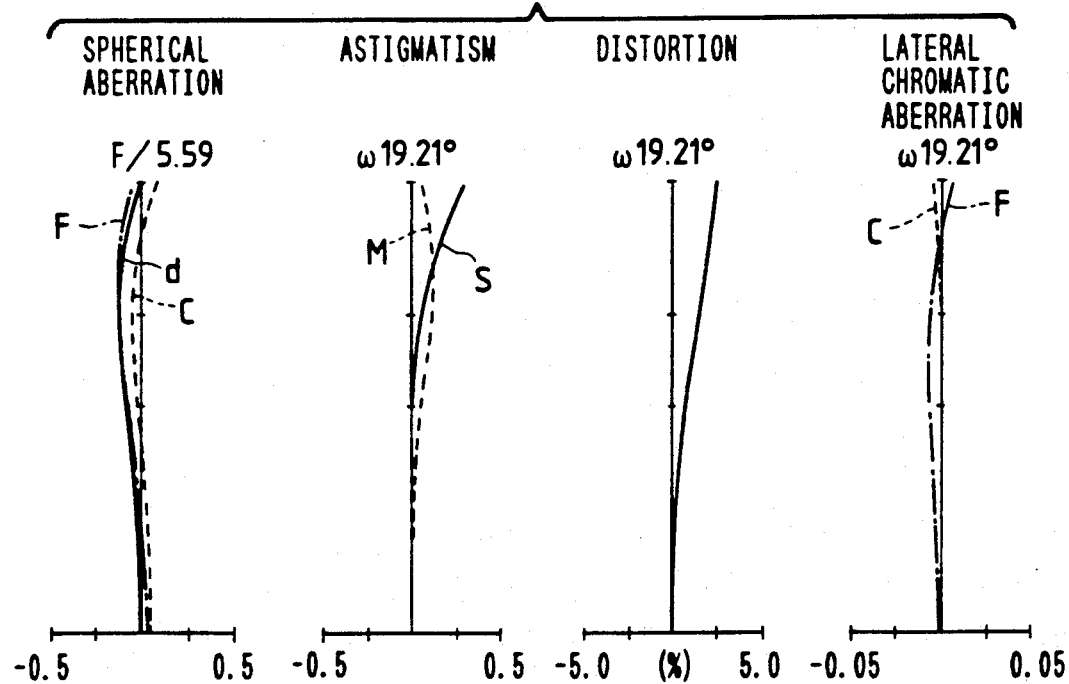

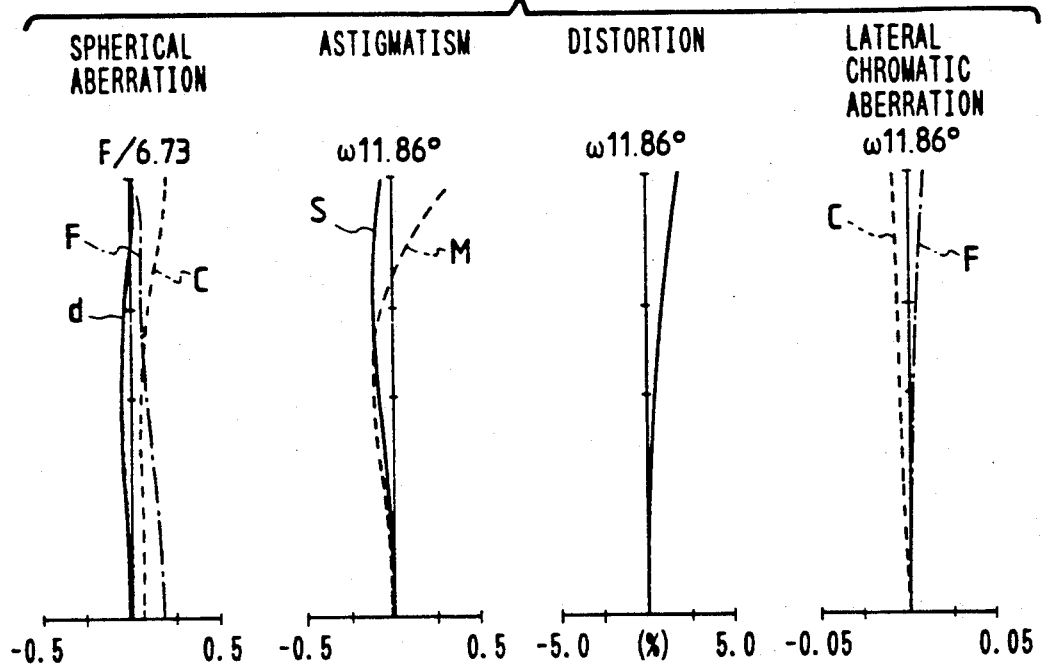
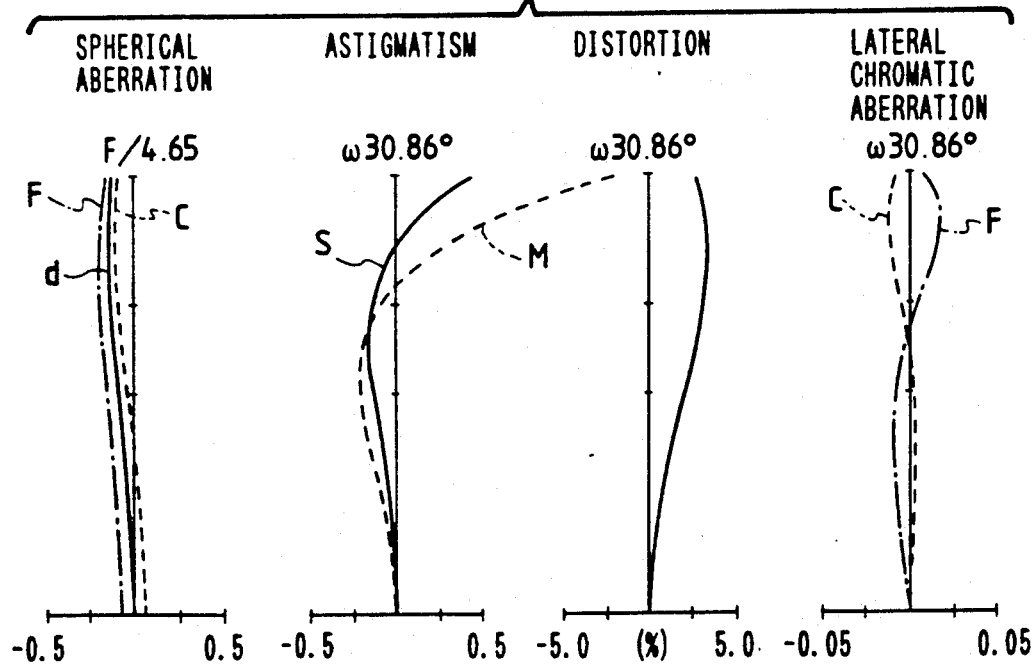

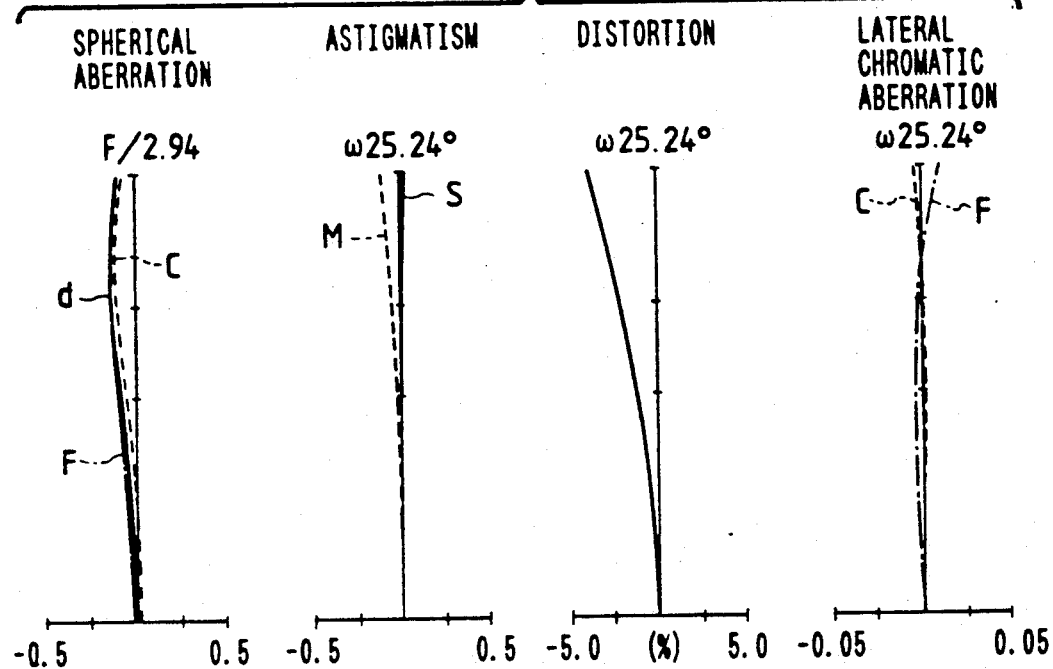
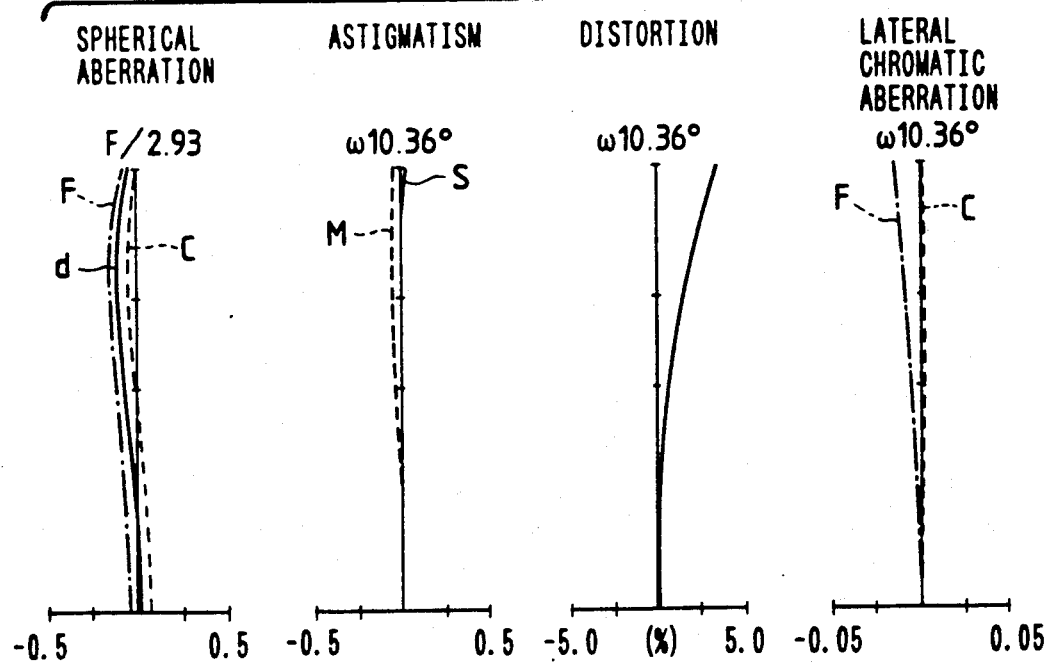

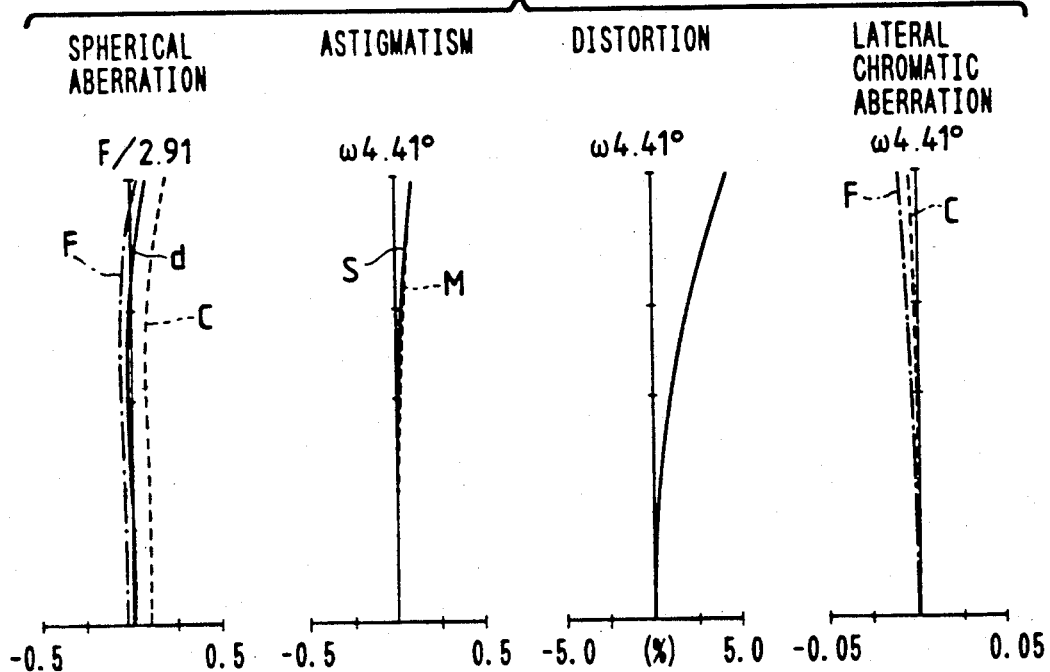
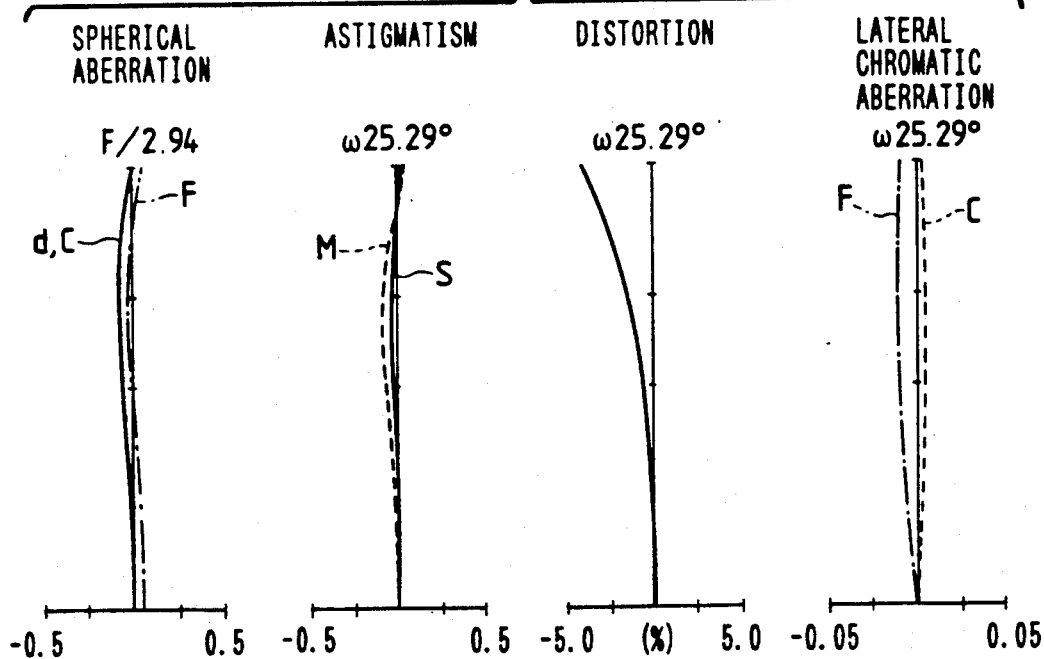

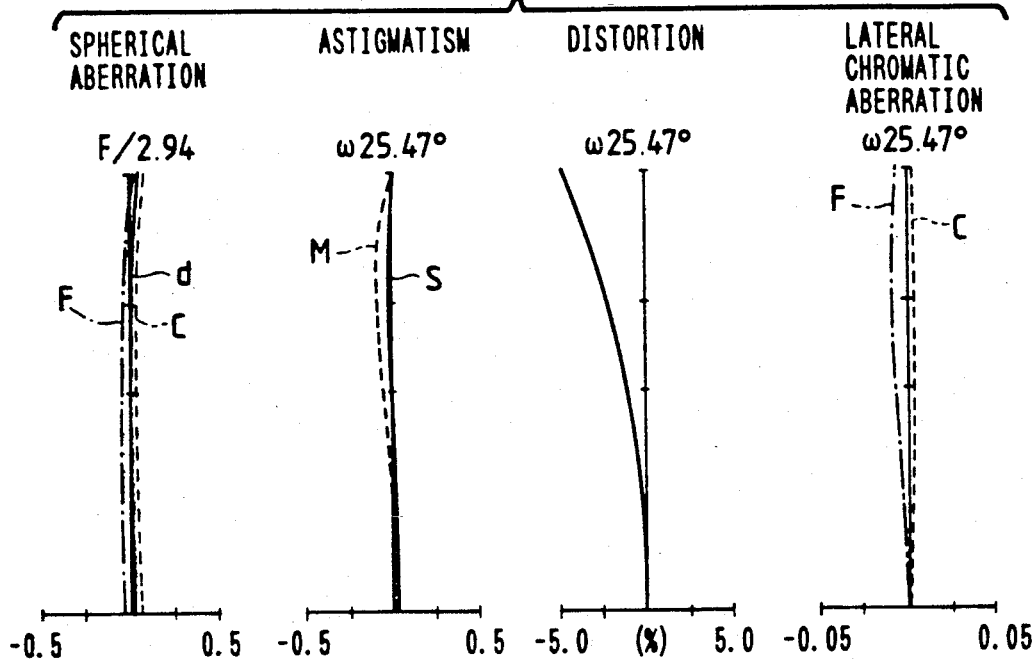
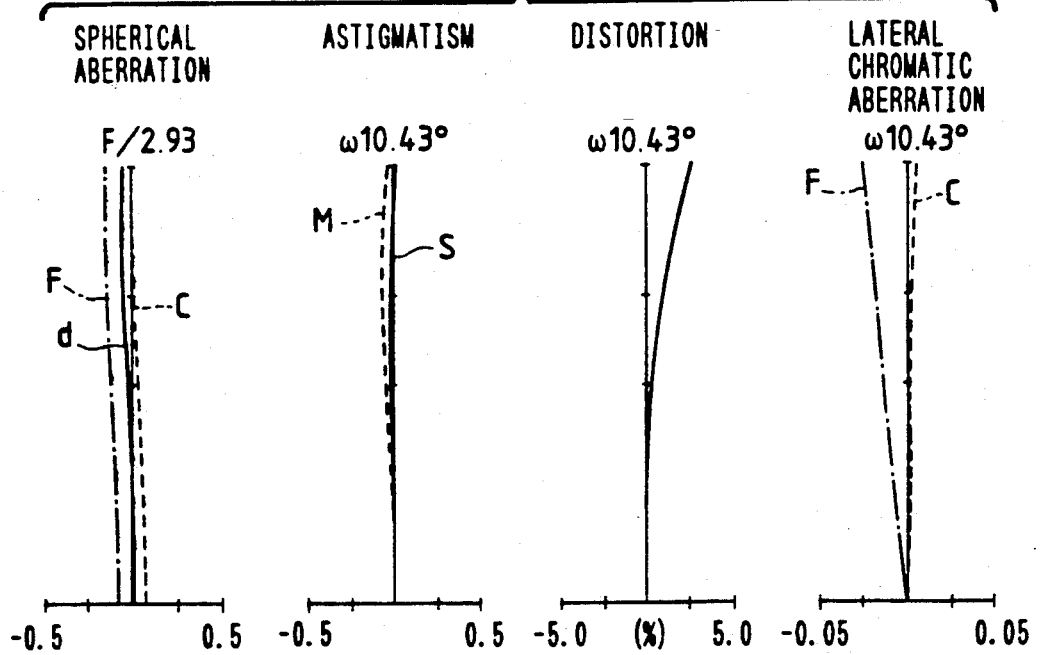

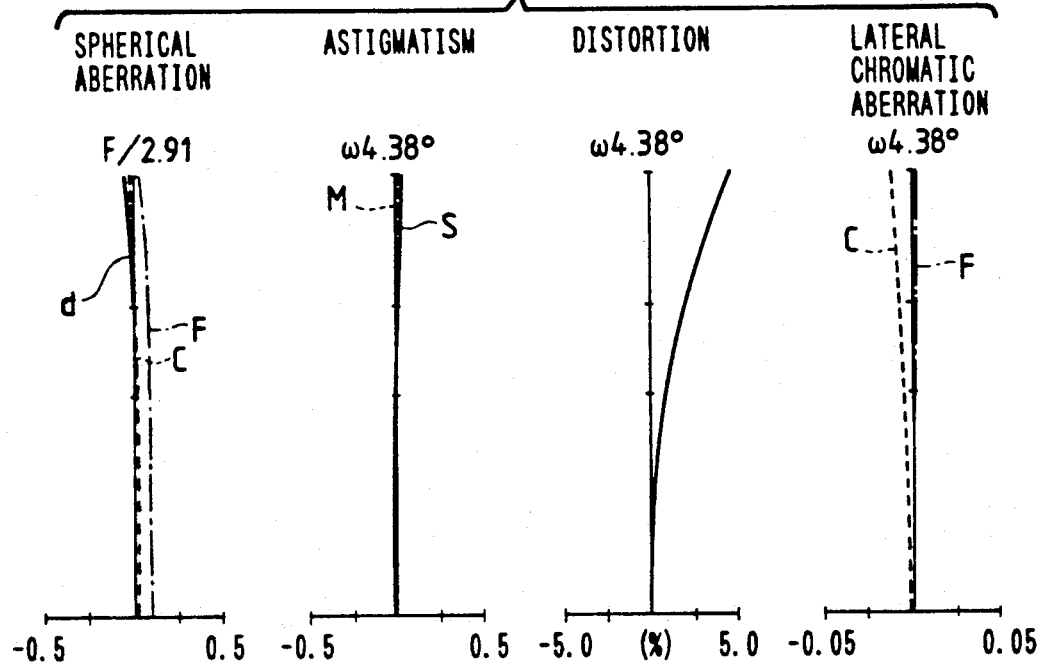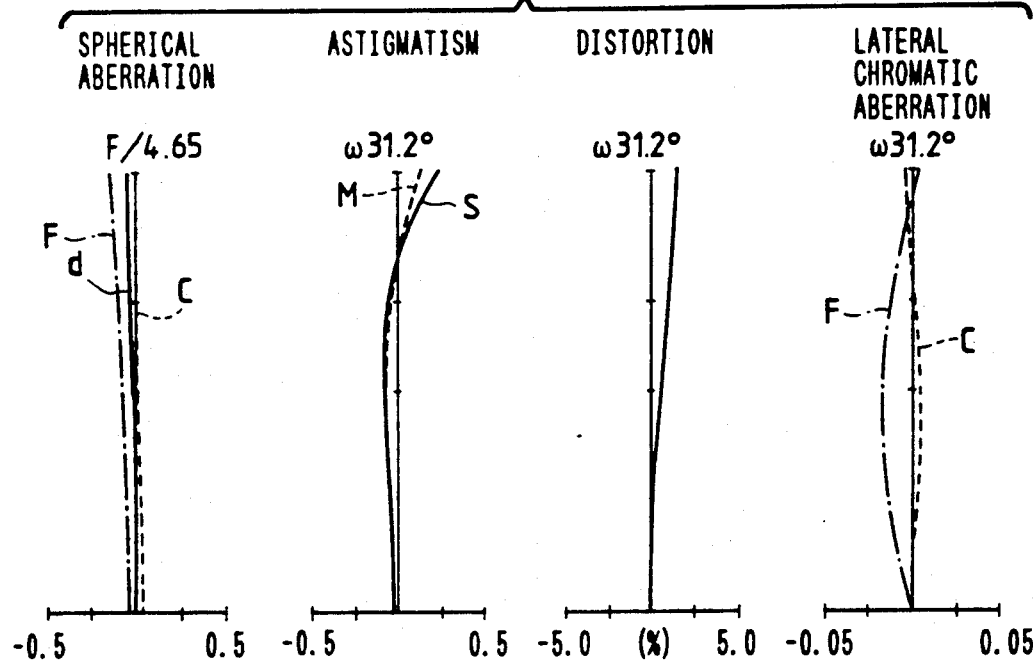

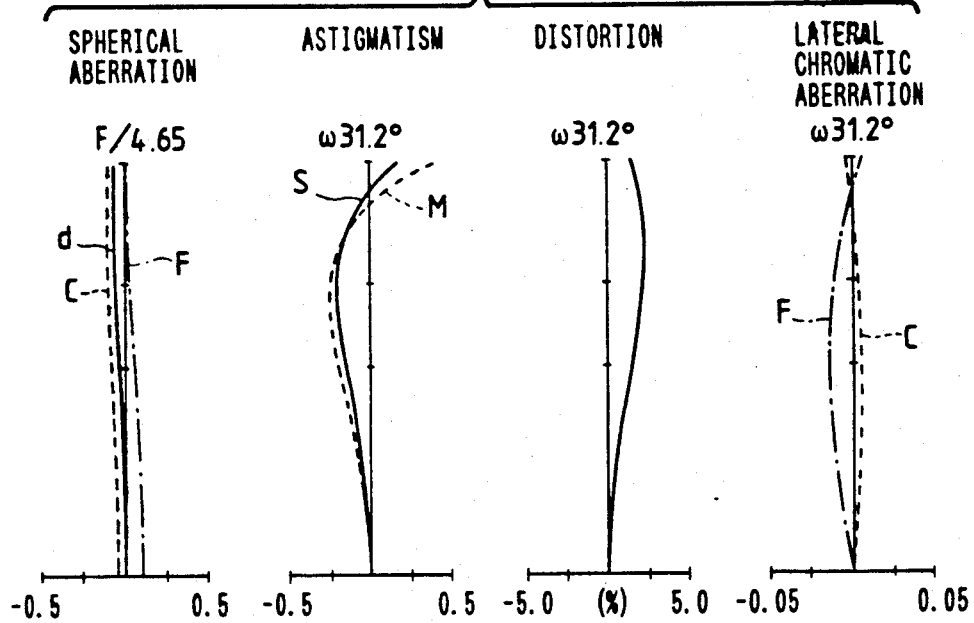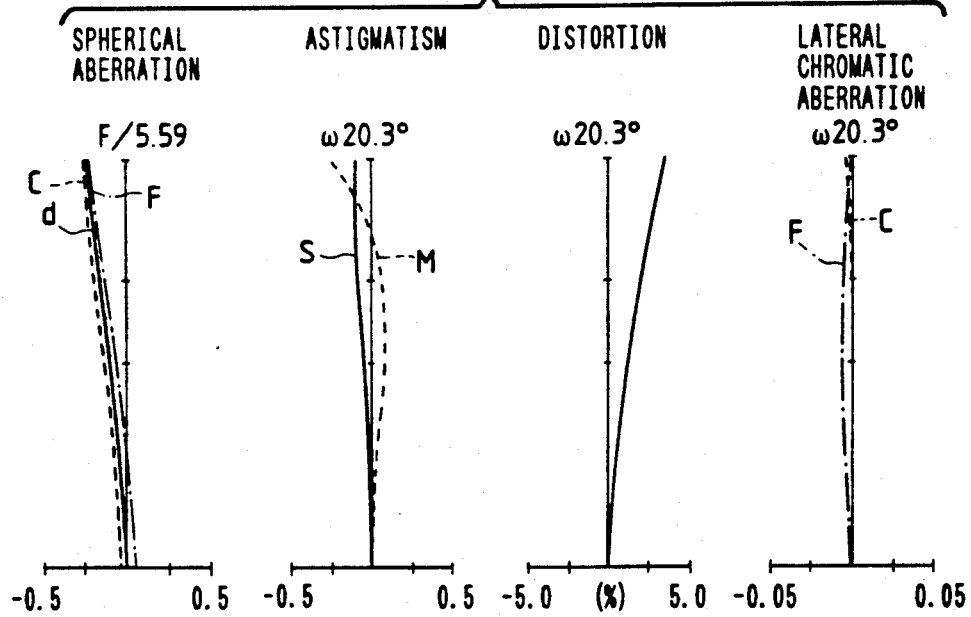

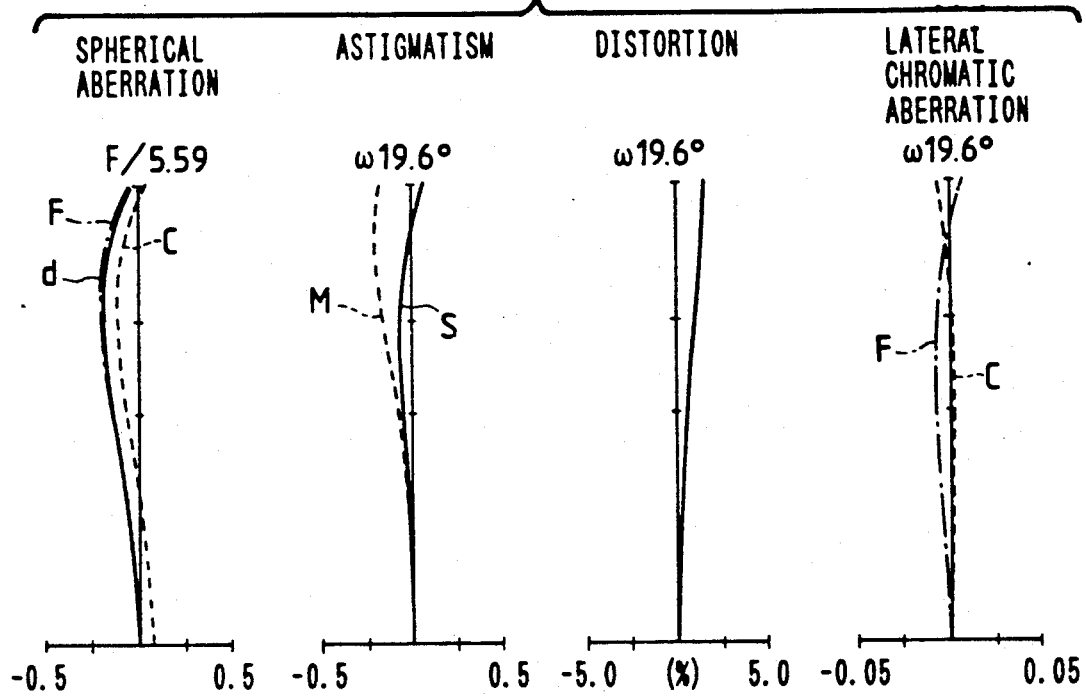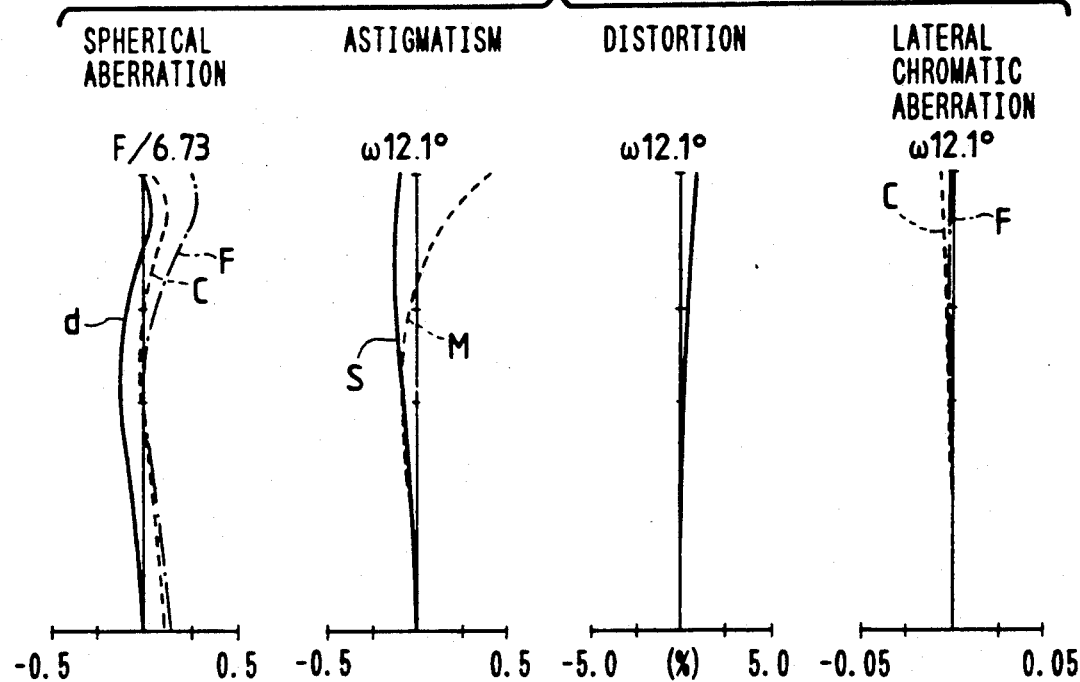

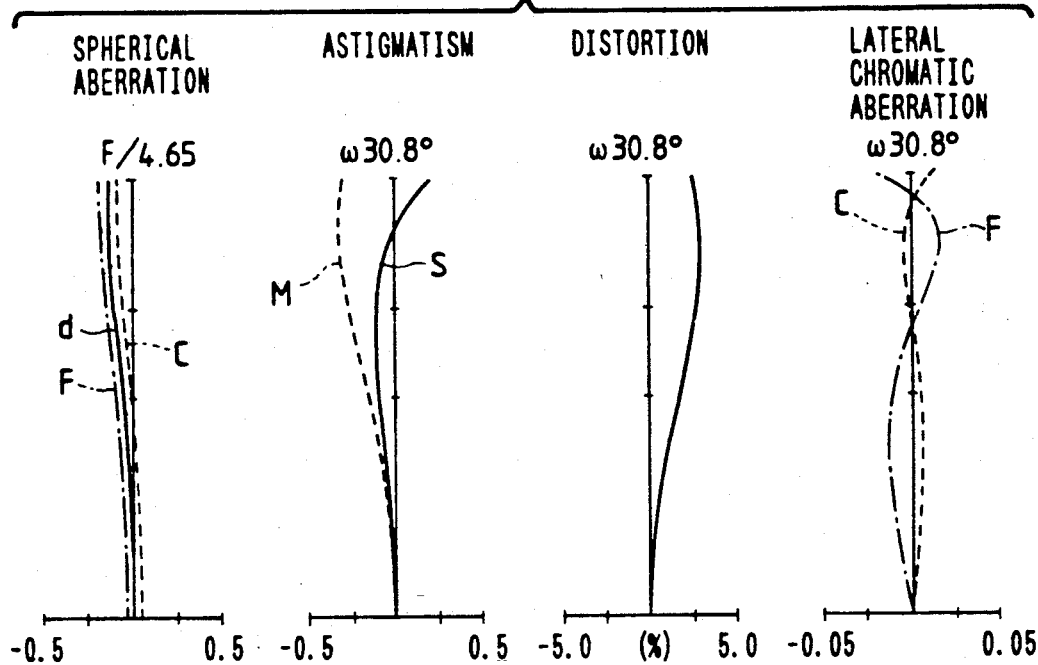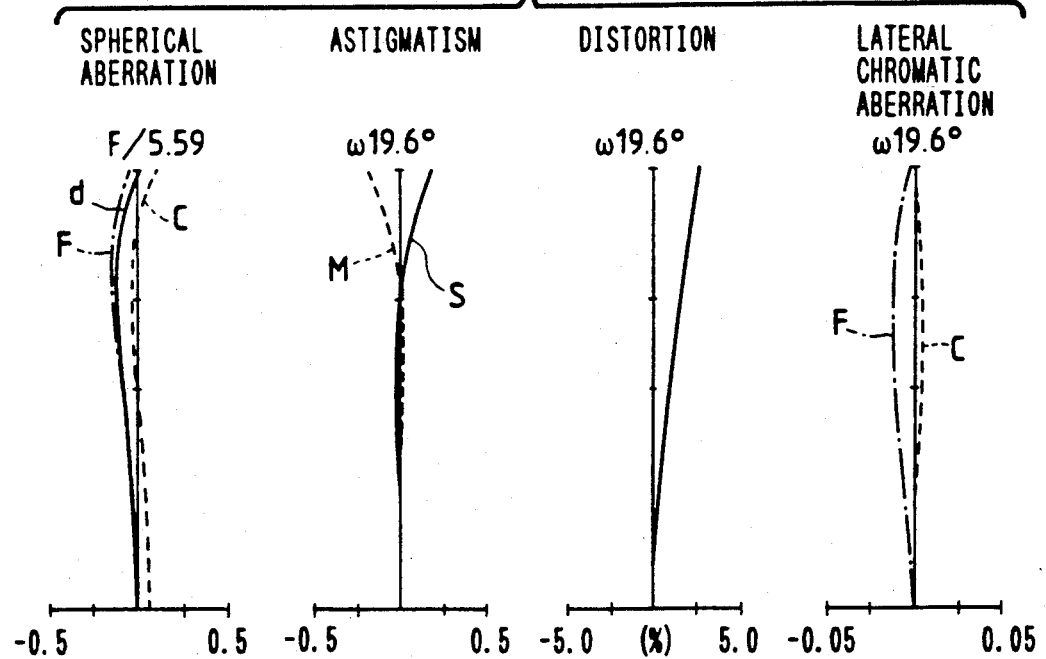

VARI-FOCAL LENS SYSTEM HAVING GRADED REFRACTIVE INDEX LENS

BACKGROUND OF THE INVENTION a) Field of the Invention

The present invention relates to a vari-focal lens system having at least one graded refractive index lens.

b) Description of the Prior Art

In the recent years where electrical and mechanical systems have been made more compact in silver salt cameras and video cameras, lens systems, especially vari-focal lens systems, for such cameras have been demanded that satisfy the requirements of compact designs, light weights and high specifications. Under such circumstances, it is very difficult to correct aberrations favorably in lens systems only using homogenous spherical lenses and aspherical lenses are used for correcting aberrations. However, the above-mentioned requirements cannot be satisfied even by using aspherical lenses.

For this reason, attention is now attracted to lens systems having graded refractive index lenses (GRIN lenses).

As the conventional zoom lens systems using GRIN lenses for lens shutter cameras, there are known, for example, the lens systems disclosed by Japanese Patent Kokai Publication No. Sho 61-148414 and Japanese Patent Kokai Publication No. Sho 61-295524. These zoom lens systems are designed so as to have total lengths shortened by arranging negative lens units on the extreme image side. However, these zoom lens systems cannot provide sufficient vari-focal effects due to low vari-focal ratios of 1.5 to 2 and total lengths of these lens systems are not short for the vari-focal ratios thereof.

Further, as lens systems which are suited for use in single reflex lens cameras or electronic still cameras and comprise GRIN lenses, there are known the lens systems disclosed by Japanese Patent Kokai Publication No. Sho 61-126515 and Japanese Patent Kokai Publication No. Sho 61-138913.

Refractive indices of the GRIN lenses manufactured by the ion exchange method, Sol-Gel method, etc. are distributed, on the $n_d - \nu_d$ graph, from the high refractive index-high dispersion region to the low refractive index-low dispersion region, and it is deemed that GRIN lenses having such refractive index distributions are manufacturable rather easily in practice. In contrast, both the GRIN lenses used in the above-mentioned lens systems have refractive indices distributed from the high refractive index-low dispersion region to the low refractive index-high dispersion region, and it cannot be said that these GRIN lenses are used effectively from the viewpoint of practical manufacturing of the GRIN lenses.

SUMMARY OF THE INVENTION

A primary object of the present invention is to provide a vari-focal lens system having at least one graded refractive index lens, a short total length despite a high vari-focal ratio, and favorably corrected aberrations.

Another object of the present invention is to provide a vari-focal lens system comprising at least one graded refractive index lens having a refractive index distributed in the direction perpendicular to the optical axis from the high refractive index-high dispersion region to the low refractive index-low dispersion region as traced on the $n_d - \nu_d$ graph.

A further object of the present invention is to provide a vari-focal lens system adapted so as to favorably correct chromatic aberration by adequately selecting a shape and a refractive index profile for a graded refractive index lens.

A first type of the vari-focal lens system according to the present invention consists of a plurality of lens units including at least one lens unit having a negative refractive power and at least one positive lens unit, and adapted so as to vary focal length of the lens system by moving at least one of these lens units along the optical axis, the lens unit arranged on the extreme image side having a negative refractive power and consisting only of lens components having negative refractive powers, and at least one graded refractive index lens having refractive index distribution in the direction perpendicular to the optical axis being comprised in any one of the negative lens components.

A second type of the vari-focal lens system according to the present invention consists of a plurality of lens units including at least one lens unit having a negative refractive power and at least one lens unit having a positive refractive power, and adapted so as to vary focal length of the lens system by moving at least one of these lens units along the optical axis, the lens unit arranged on the extreme object side having a positive refractive power and at least one graded refractive index lens having refractive index distribution in the direction perpendicular to the optical axis being comprised in at least one of the negative lens units comprised in said vari-focal lens system.

The refractive index of said graded refractive index lens is expressed by the following formula (i):

$$n(r) = n_0 + n_1 r^2 + n_2 r^4 + n_3 r^6 + \ldots \quad (i)$$

wherein the reference symbol $n_0$ represents refractive index of the graded refractive index lens as measured on the optical axis, the reference symbol r designates the distance as measured in the radial direction from the optical axis, the reference symbol n(r) denotes the refractive index of the graded refractive index lens as measured at a point located at the radial distance of r from the optical axis, and the reference symbols $n_1$, $n_2$, $n_3$, ... represent the refractive index distribution coefficients of the second, fourth and sixth orders respectively.

Further, the vari-focal lens system according to the present invention satisfies the following conditions (1) and (2):

(1) $-1.0 < \phi_M/\phi_H < 0.0$ (2) $0.0 < \phi_G/\phi_n < 1.0$ wherein the reference symbol $\phi_M$ represents the refractive power of the medium of the graded refractive index lens, the reference symbol $\phi_H$ designates the refractive power of a homogenous lens which has the refractive power of the graded refractive index lens as measured on the optical axis, the reference symbol $\phi_G$ denotes the refractive power of the graded refractive index lens as a whole and the reference symbol $\phi_n$ represents the refractive power of the negative lens unit comprising the graded refractive index lens.

The vari-focal lens system according to the present invention is designed so as to satisfy the conditions (1) and (2), whereby the lens system can fully exhibit its aberration correcting capability when the lens system uses the GRIN lens which has a refractive index distribution from the high refractive index-high dispersion region to the low refractive index-low dispersion or from the low refractive index-low dispersion region to the high refractive index-high dispersion region as traced on the $n_d - v_d$ graph.

The condition (1) defines the ratio between the refractive power of the medium of the GRIN lens and the refractive power of a homogenous lens having the refractive power of the GRIN lens as measured on the optical axis, i.e., the refractive power determined by the surface shape of the GRIN lens. The condition (1) means that the refractive index of the medium of the GRIN lens has a sign reversed compared to that of the refractive power determined by said surface shape and that the refractive power determined by the surface shape has an absolute value larger than that of the refractive power of the medium The condition (2) defines the ratio between the refractive power of the GRIN lens as a whole and the refractive power of the negative lens unit comprising the GRIN lens. The condition (2) means that refractive power of the GRIN lens as a whole has the same sign as that of the refractive power of said negative lens unit as a whole, and that the negative lens unit is to comprise at least one lens component having refractive power of the same sign (negative refractive power).

A radial type GRIN lens having the refractive index distribution in the direction perpendicular to the optical axis has an aberration correcting function excellent especially for longitudinal chromatic aberration.

The condition required for correcting the longitudinal chromatic aberration with a single radial GRIN lens is as follows:

$$\phi_S/v_{0d} + \phi_M/v_{1d} = 0 \tag{ii}$$

wherein the reference symbols $\phi_S$ and $\phi_M$ represent refractive powers of the surface and the medium of the GRIN lens, the reference symbol $v_{0d}$ designates the Abbe's number determined by the refractive index of the GRIN lens as measured on the optical axis, the reference symbol $v_{1d}$ denotes the value calculated by the following formula (iii) from the coefficients of $n_{1d}$, $n_{1F}$ and $n_{1C}$ of the second order for the d-line, F-line and C-line respectively used in the formula (i) of refractive index distribution:

$$v_{1d} = n_{1d}/(n_{1F} - n_{1C}) \tag{iii}$$

As is clear from the above-mentioned formula (ii) for correction of the longitudinal chromatic aberration, it is possible to correct the longitudinal chromatic aberration with a single radial type GRIN lens by adequately selecting the refractive power $\phi_M$ of medium and the value of $v_{1d}$.

When the refractive index distributions of GRIN lenses manufactured by the ion exchange method, Sol-Gel method, etc. are traced on the $n_d - v_d$ graph, most of the refractive indices are distributed from the high refractive index-high dispersion region to the low refractive index-low dispersion region as already described above. Accordingly, an attempt to enlarge the difference $\Delta n$ between the refractive power on the optical axis and the refractive power at the outermost marginal portion will make more remarkable the tendency from the high refractive index-high dispersion region to the low refractive index-low dispersion region. This tendency is expressed by the following formula (iv):

$$0 < v_{1d} < v_{0d} \tag{iv}$$

From the formulae (ii) and (iv) mentioned above, it will be understood that the longitudinal chromatic aberration can be corrected with a single GRIN lens by selecting the signs reverse to each other for the refractive power of surface and the refractive power of medium respectively, and an absolute value of the refractive power of the surface larger than that of the refractive power of the medium. In the vari-focal lens system according to the present invention wherein the refractive power of surface and the refractive power of medium have the same signs as each other, the longitudinal chromatic aberration can be corrected by designing the lens system so as to satisfy the condition (1). Further, it is possible to produce a positive or negative longitudinal chromatic aberration depending on selection of the ratio of the refractive power of surface relative to the refractive power of medium and the ratio of $v_{0d}$ relative to $v_{1d}$. In contrast to the fact that a positive homogenous lens always produces a positive longitudinal chromatic aberration and a negative homogenous lens always produces a negative longitudinal chromatic aberration, a single GRIN lens can zero the longitudinal chromatic aberration, produce the positive longitudinal chromatic aberration or produce the negative longitudinal chromatic aberration regardless of positive or negative refractive power of the GRIN lens as a whole.

It is generally desirable for a vari-focal lens system to have aberrations corrected independently in the individual lens units thereof, especially in the lens unit contributing to the variation of focal length.

In order to correct the chromatic aberration in a lens system consisting only of homogenous lenses, it is necessary to use at least two lens elements having refractive powers of different signs. Accordingly, it is necessary for imparting a desired refractive power to a lens unit to strengthen refractive powers of the lens elements composing the lens unit to levels higher than required, thereby producing a vicious cycle and aggravating aberrations.

Under the above-described current circumstances where high specifications, compact design and high vari-focal ratios are desired for vari-focal lens systems, it is necessary to impart high refractive powers especially to the lens units which contribute to variation of focal lengths. For this reason, limitations are imposed on compact design and enhancement of vari-focal ratios of the lens systems which are composed only of homogenous lenses and must use lens elements having refractive powers of different signs.

A radial GRIN lens such as that used in the vari-focal lens system according to the present invention can correct chromatic aberration by itself and, even when a high refractive power is imparted to a lens unit, the GRIN lens allows to add a lens element having refractive power of the same sign as that of the refractive power of the GRIN lens without posing a problem on correction of aberrations since it is capable of producing chromatic aberration of the sign reverse to that of the chromatic aberration produced by the surface thereof. Accordingly, the GRIN lens makes it unnecessary to use lens elements having refractive powers having different signs and allows to impart the required refractive power to the lens unit without strengthening the refractive power of each lens elements.

That is to say, it is possible to correct the chromatic aberration in the lens unit, even when a lens element having refractive power of the same sign as that of the refractive power of the GRIN lens is added, by designing the GRIN lens so as to satisfy the condition (1) and increasing the chromatic aberration to be produced by the medium thereof so as to satisfy the condition (2) since the chromatic aberration to be produced by the medium of the GRIN lens can be controlled by selection of $v_{1d}$ and $v_{0d}$.

As is understood from the foregoing description, it is possible to share refractive powers among individual lens elements by using the GRIN lens and imparting a high refractive power to the lens unit while keeping aberrations at low levels in the vari-focal lens system according to the present invention unlike the lens system which is composed only of homogenous lens elements and cannot correct aberrations without using lens elements having refractive powers of different signs.

The vari-focal lens system according to the present invention comprises a lens unit having a positive refractive power which is arranged on the extreme object side, and uses the GRIN lens, in the negative lens unit having a main function for variation of focal length of the lens system, which can correct the longitudinal chromatic aberration regardless of the sign of the refractive power thereof, or produce either positive or negative longitudinal chromatic aberration. By designing the GRIN lens so as to satisfy the condition (1), the surface of the GRIN lens has a negative refractive power and the medium thereof has a positive refractive power.

The negative lens unit may be composed only of the GRIN lens. However, the GRIN lens has a feature to be capable of having a high positive refractive power of the medium thereof and this feature makes it possible to add at least one negative lens element, to the GRIN lens satisfying the condition (2), which has a refractive power of the same sign as that of the refractive power of the negative lens unit so as to further strengthen the refractive power of the lens unit. Since the chromatic aberration can be corrected in the lens unit even when it is composed of lens elements having refractive powers of the same sign, it is possible to strengthen the refractive power of the lens unit without strengthening the refractive powers of the lens elements to levels higher than required or aggravating aberrations.

If the upper limit or the lower limit of the condition (1) is exceeded, the chromatic aberration will be aggravated in the vari-focal lens system according to the present invention. If the upper limit or the lower limit of the condition (2) is exceeded, it will be impossible to strengthen the refractive power of the lens unit, thereby producing an effect undesirable for compact design of the vari-focal lens system.

In order to especially shorten the total length of the vari-focal lens system according to the present invention, it is sufficient to arrange a lens unit having negative refractive power on the extreme image side and compose this lens unit only of lens elements having negative refractive powers. Further, in order to design the vari-focal lens system so as to have a high vari-focal ratio, a short total length and offaxial aberrations corrected at the wide position thereof, it is desirable to compose the lens unit having the negative refractive power of at least two lens elements. However, since the lens unit having the negative refractive power comprises no positive lens element, it cannot correct the chromatic aberration when it is composed only of homogeneous lens elements. Accordingly, the negative lens unit must comprise a GRIN lens which is designed as a radial GRIN lens having the refractive index distribution expressed by the above-mentioned formula (i).

The lens unit which is arranged on the extremely image side and has the negative refractive power produces negative longitudinal chromatic aberration since the lens unit comprises no lens element producing positive longitudinal chromatic aberration. In order to cancel the negative longitudinal chromatic aberration by producing positive longitudinal chromatic aberration with medium of at least one GRIN lens arranged in the lens unit, it is necessary for the GRIN lens to satisfy the following condition (3):

$$\frac{1}{(f_w)^2 \cdot n_{1d} \cdot v_{1d}} < 0 \qquad (3)$$

wherein the reference symbol $f_w$ represents the focal length of the vari-focal lens system as a whole at the wide position thereof, and the reference symbols $n_{1d}$ and $v_{1d}$ designates the values of the coefficient of the second order in the refractive index distribution formula for the GRIN lens for the d-line and the value calculated by the formula (iii).

If the upper limit of the condition (3) is exceeded, it will be impossible to produce the positive longitudinal chromatic aberration with the medium of the GRIN lens or correct the longitudinal chromatic aberration favorably in the vari-focal lens system as a whole.

In order to shorten the total length of the vari-focal lens system according to the present invention, the negative refractive power of the lens unit arranged on the extremely image side is strengthened. Accordingly, this lens unit produces remarkable negative longitudinal chromatic aberration. In order to correct this negative longitudinal chromatic aberration, the medium of the GRIN lens must produce remarkable positive longitudinal chromatic aberration and it is necessary for the GRIN lens to satisfy the following condition (4).

(4) $|v_{1d}| < 50$

If the upper limit of the condition (4) is exceeded, it will be impossible for the GRIN lens to produce the positive longitudinal chromatic aberration or correct the negative longitudinal chromatic aberration produced by the negative lens unit.

In order to enhance the vari-focal ratio and shorten the total length of the vari-focal lens system according to the present invention at the same time, it is desirable that the lens system satisfies the following conditions (5) and (6):

(5) $-0.40 < f_n/f_T < -0.05$ (6) $0.20 < B_w/z < 0.07$ wherein the reference symbol $f_n$ represents the focal length of the negative lens unit arranged on the extreme image side, the reference symbol $f_T$ designates the focal length of the vari-focal lens system as a whole at the tele position thereof, the reference symbol $B_w$ denotes the telephoto ratio (total length/focal length) at the wide position and the reference symbol $z$ represents the vari-focal ratio of the lens system.

If the lower limit of the condition (5) is exceeded, the negative lens unit arranged on the extreme image side will have too weak a refractive power, thereby making it impossible to shorten the total length of the vari-focal lens system. If the upper limit of the condition (5) is exceeded, in contrast, the negative lens unit arranged on the extreme image side will have too strong a refractive power, whereby the aberrations produced by this lens unit, especially the positive distortion at the wide position, cannot be corrected sufficiently.

If the lower limit of the condition (6) is exceeded, it will be possible to design the lens system to be compact, but each of the lens units will have too strong a refractive power and produce aberrations which cannot be corrected sufficiently. If the upper limit of the condition (6) is exceeded, in contrast, it will be impossible to design the lens system compact.

It is possible to correct aberrations more favorably in the vari-focal lens system according to the present invention by designing the GRIN lens used in the lens unit which has the negative refractive power and is arranged in the extremely image side so as to satisfy, in place of the above-mentioned condition (3), the following condition (3'):

$$-20 < \frac{1}{(f_w)^2 \cdot n_{1d} \cdot \nu_{1d}} < 0 \qquad (3')$$

If the lower limit of the condition (3') is exceeded, the longitudinal chromatic aberration will be corrected insufficiently by the medium of the GRIN lens.

BRIEF DESCRIPTION OF THE DRAWINGS

FIG. 1 through FIG. 10 show sectional views illustrating compositions of Embodiments 1 through 10 of the vari-focal lens system according to the present invention;

FIG. 11 through FIG. 13 show graphs illustrating aberration characteristics at the wide position, intermediate focal length and tele position of the Embodiment 1 of the present invention;

FIG. 14 through FIG. 16 show graphs illustrating aberration characteristics at the wide position, intermediate focal length and tele position of the Embodiment 2 of the present invention;

FIG. 17 through FIG. 19 show curves illustrating aberration characteristics at the wide position, intermediate focal length and tele position of the Embodiment 3 of the present invention;

FIG. 20 through FIG. 22 show curves illustrating aberration characteristics at the wide position, intermediate focal length and tele position of the Embodiment 4 of the present invention;

FIG. 23 through FIG. 25 show graphs illustrating aberration characteristics at the wide position, intermediate focal length and tele position of the Embodiment 5 of the present invention;

FIG. 26 through FIG. 28 show graphs illustrating aberration characteristics at the wide position, intermediate focal length and tele position of the Embodiment 6 of the present invention;

FIG. 29 through FIG. 31 show curves illustrating aberration characteristics at the wide position, intermediate focal length and tele position of the Embodiment 7 of the present invention;

FIG. 32 through FIG. 34 show curves visualizing aberration characteristics at the wide position, intermediate focal length and tele position of the Embodiment 8 of the present invention;

FIG. 35 through FIG. 37 show graphs visualizing aberration characteristics at the wide position, intermediate focal length and tele position of the Embodiment 9 of the present invention.

DETAILED DESCRIPTION OF THE PREFERRED EMBODIMENTS

Figure 2:
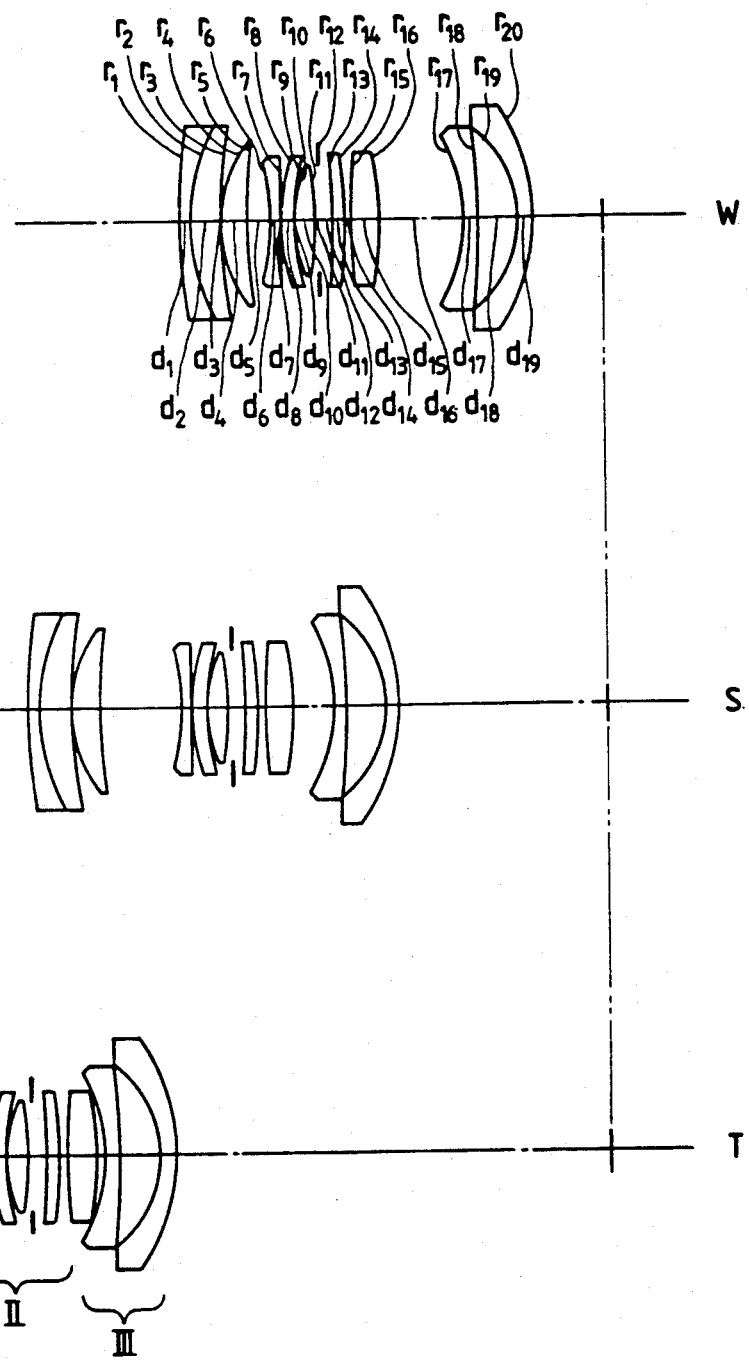

Now, the present invention will be described in more detail below with reference to the preferred embodiments illustrated in the accompanying drawings.

Embodiment 1 has the composition illustrated in FIG. 1, and comprises, in the order from the object side, a first lens unit I having a positive refractive power, a second lens unit II having a positive refractive power, a third lens unit III having a positive refractive power and a fourth lens unit IV having a negative refractive power. The GRIN lens satisfying the conditions (1) and (2) is used in the fourth lens unit IV having the negative refractive power.

Embodiment 1 is designed as a vari-focal lens system which is to be used in lens shutter cameras, has a vari-focal ratio of approximately 3 and is made compact by using the GRIN lens. When an attempt is made to design this vari-focal lens system compact, a problem is posed especially by the positive distortion to be produced at the wide position of the lens system. This positive distortion is produced mainly by the fourth lens unit IV having the negative refractive power. In the vari-focal lens system according to the present invention, the positive distortion is reduced by designing the fourth lens unit IV so as to have a shape which is concentric with regard to a stop. The distortion remaining after the correction by the concentric shape is corrected by the GRIN lens used in the fourth lens unit IV. That is to say, it is possible to correct the positive distortion to be produced in the fourth lens unit IV by selecting the correcting terms in the refractive index distribution formula so as to produce negative distortion since the GRIN lens satisfying the conditions (1) and (2) which is adopted for making the vari-focal lens system compact and correcting the chromatic aberration has the refractive index distribution of the surface thereof.

In order to correct the distortion as described above, it is desirable that the GRIN lens satisfies the following condition (7):

(7) $-15 < n_{1d}(f_w)^2 < 0.0$ wherein the reference symbol $n_{1d}$ represents the distribution coefficient of the second order of the GRIN lens for the d-line.

If the lower limit of the condition (7) is exceeded, the GRIN lens will have too strong a refractive power of the medium thereof and it will be obliged to strengthen the negative refractive power of the surface thereof for obtaining the required refractive power, thereby making it difficult to correct the aberrations to be produced by this surface. If the upper limit of the condition (7) is exceeded, the medium of the GRIN lens will have a negative refractive power, thereby making it impossible to correct especially the chromatic aberration and distortion.

It is possible to correct the aberrations by designing any lens element arranged in the negative lens unit. However, it is the most effective to design the lens element arranged on the extremely object side in the fourth lens unit IV as the GRIN lens, because the varifocal lens system preferred as Embodiment 1 varies the spherical aberration and longitudinal chromatic aberration remarkably at the tele position due to the high vari-focal ratio thereof, and allows the marginal ray to be the highest, at the tele position, on the lens element which is arranged on the extremely object side in the fourth lens unit IV having the negative refractive power.

The vari-focal lens system preferred as the Embodiment 1 uses, on the positive lens element arranged on the extremely image side in the third lens unit III, an aspherical surface having a positive refractive power which is strengthened as the surface portions thereof are farther from the optical axis. This aspherical surface serves for correcting the spherical aberration which is apt to be produced on the negative side at the tele position.

When the optical axis is taken as the x axis and the direction perpendicular to the optical axis is taken as the y axis, the shape of the aspherical surface is expressed by the following formula:

$$x = \frac{y^2/r}{1 + \sqrt{1 - p(y/r)^2}} + \sum_{i=2}^{n} A_{2i} y^{2i}$$

wherein the reference symbol r represents radius of curvature on the reference sphere of said aspherical surface, the reference symbol p designates the conical constant and the reference symbol $A_{2i}$ denotes the aspherical surface coefficient.

As is understood from the foregoing description, Embodiment 1 is designed as a very compact vari-focal lens system which has a vari-focal ratio of approximately 3, and telephoto ratios of 1.23 and 0.79 at the wide position and tele position respectively by using at least one GRIN lens satisfying the conditions (1), (2) and (7) in the fourth lens unit IV.

Embodiment 2 of the present invention is a vari-focal lens system which has the composition illustrated in FIG. 2 and comprises, in the order from the object side, a first lens unit I having a positive refractive power, a second lens unit II having a positive refractive power and a third lens unit III having a negative refractive power, and has a vari-focal ratio of approximately 3. Used in the third lens unit having the negative refractive power is a GRIN lens which satisfies the conditions (1), (2) and (7). This GRIN lens has the function similar to that of the GRIN lens used in the Embodiment 1.

In the vari-focal lens system preferred as Embodiment 2, the positive lens element arranged on the extremely image side in the second lens unit II is designed as a GRIN lens which is made of a medium having negative refractive power, and therefore serves to correct coma within the range from the wide position to the tele position and the spherical aberration apt to be produced on the negative side at the tele position.

In the Embodiment 2, the spherical aberration at the tele position is corrected more favorably by using in the first lens unit I an aspherical surface having positive refractive power weakened as the surface portions are farther from the optical axis.

As is understood from the foregoing description, the Embodiment 2 is designed as an ultra-compact vari-focal lens system having a telephoto ratio of 1.16 though it is composed of the three lens units.

Figure 3:
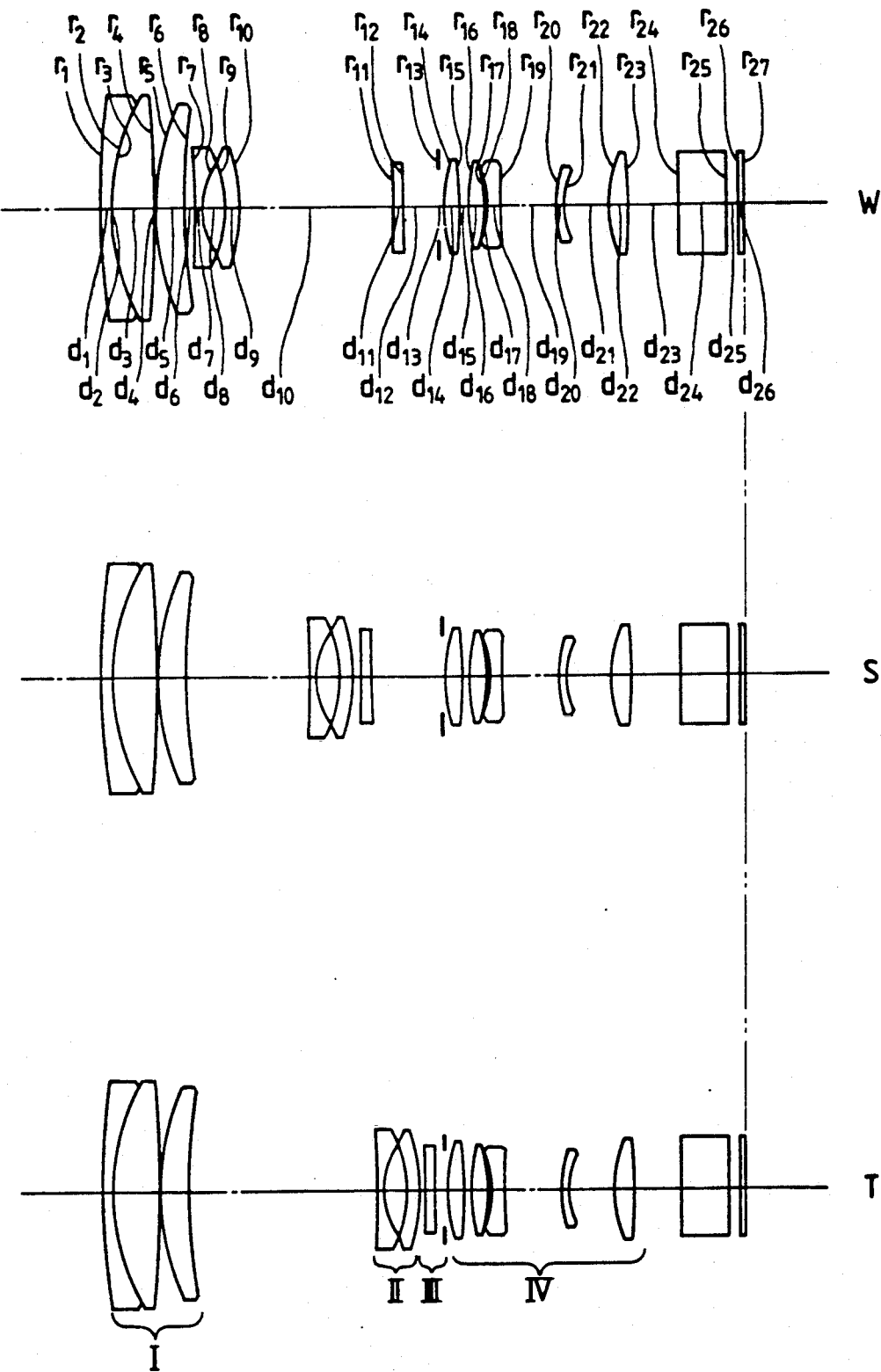

The Embodiment 3 is a vari-focal lens system which has the composition illustrated in FIG. 3, comprises, in the order from the object side, a first lens unit I having a positive refractive power, a second lens unit II having a negative refractive power, a third lens unit III having a negative refractive power and a fourth lens unit IV having a positive refractive power, and is designed for a vari-focal ratio of approximately 6.

Also in the Embodiment 3, a GRIN lens which satisfies the conditions (1) and (2) is used in the second lens unit II having the negative refractive power and contributing to variation of focal length.

In order to obtain a vari-focal ratio on the order 6 of a vari-focal lens system, it is generally necessary to use, in the second lens unit which has the negative refractive power, contributes to variation of focal length and is generally referred to as the variator, at least two negative lens elements and one positive lens element for imparting a high refractive power to the variator and correcting chromatic aberration therein. When the positive lens element is used, however, the second lens unit as a whole occupies a long distance on the optical axis and cannot have a refractive power higher than a certain definite level, thereby making it impossible to shorten the total length of the vari-focal lens system beyond a certain limit.

In the Embodiment 3, the second lens unit II is composed only of negative lens elements including no positive lens element, a GRIN lens satisfying the condition (1) is used for correcting the chromatic aberration and the GRIN lens is designed so as to satisfy the condition (2) for imparting a high refractive power to the second lens unit, thereby shortening the total length of the vari-focal lens system as a whole.

In order to correct the chromatic aberration more favorably in Embodiment 3, it is desirable to design the GRIN lens so as to satisfy the following condition (8):

(8) $0 < \nu_{1d} < 50$

The condition (8) mentioned above defines the positive chromatic aberration to be produced by the medium of the GRIN lens. If the lower limit of the condition (8) is exceeded, the medium of the GRIN lens will produce the positive chromatic aberration too remarkably, thereby overcorrecting the chromatic aberration in the vari-focal lens system as a whole. If the upper limit of the condition (8) is exceeded, the positive chromatic aberration will be produced insufficiently, thereby undercorrecting the chromatic aberration in the vari-focal lens system as a whole.

Figure 4:
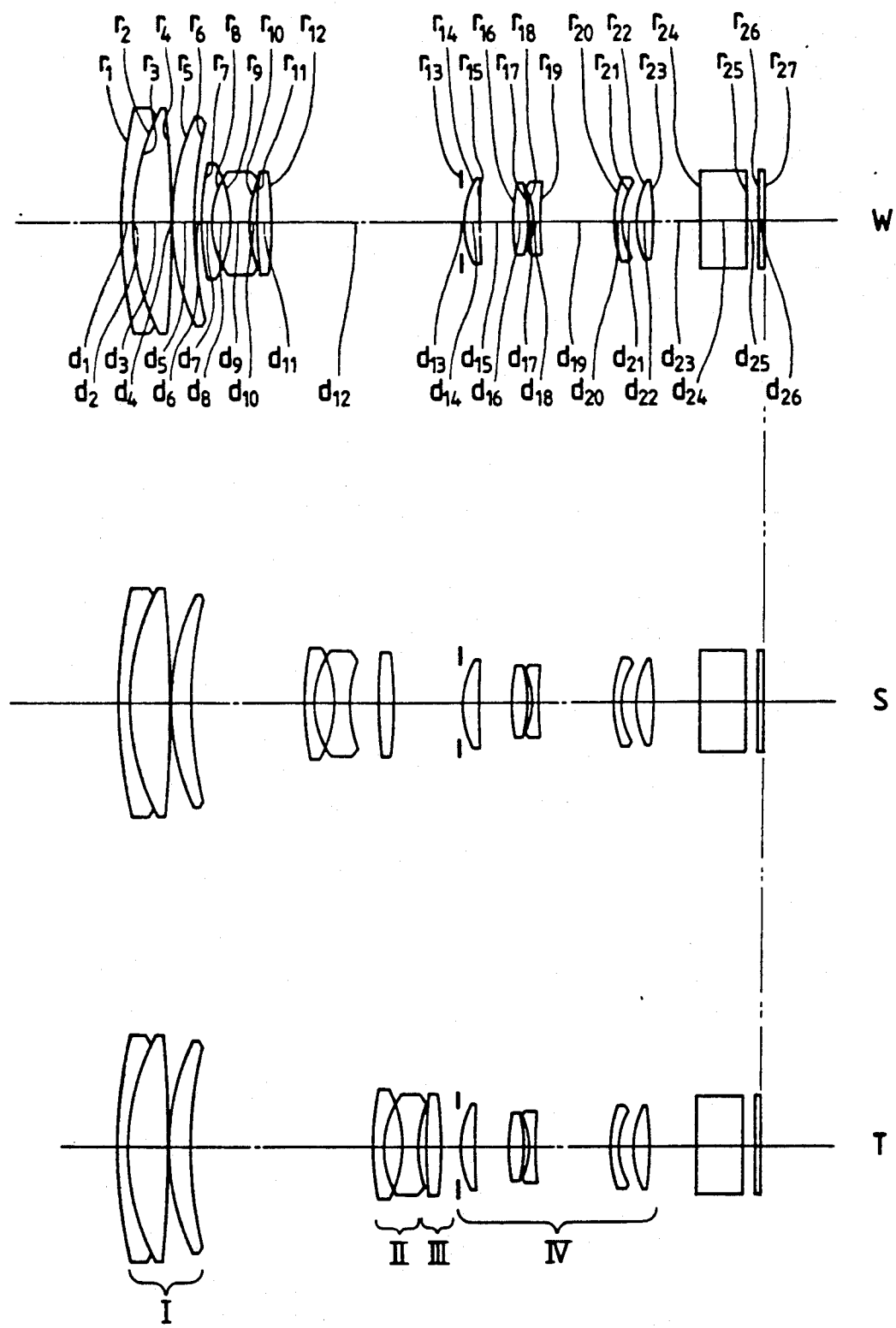

Embodiment 4 is designed as a vari-focal lens system which has the composition illustrated in FIG. 4 and comprises, in the order from the object side, a first lens unit I having a positive refractive power, a second lens unit II having a negative refractive power, a third lens unit III having a positive refractive power and a fourth lens unit IV having a positive refractive power, and is designed for a vari-focal ratio of approximately 6.

Used also in Embodiment 4 is a GRIN lens satisfying the conditons (1) and (2) in the second lens unit II which has the negative refractive and power contributes to variation of focal length. The third lens unit III which has a function to correct the displacement of the image surface caused by variation of focal length is designed so as to have the positive refractive power and be moved while kept close to the second lens unit having the negative refractive power so that the positive chromatic aberration produced by the third lens unit III can be utilized for allowing the GRIN lens to produce a reduced amount of the positive chromatic aberration.

Figure 5:
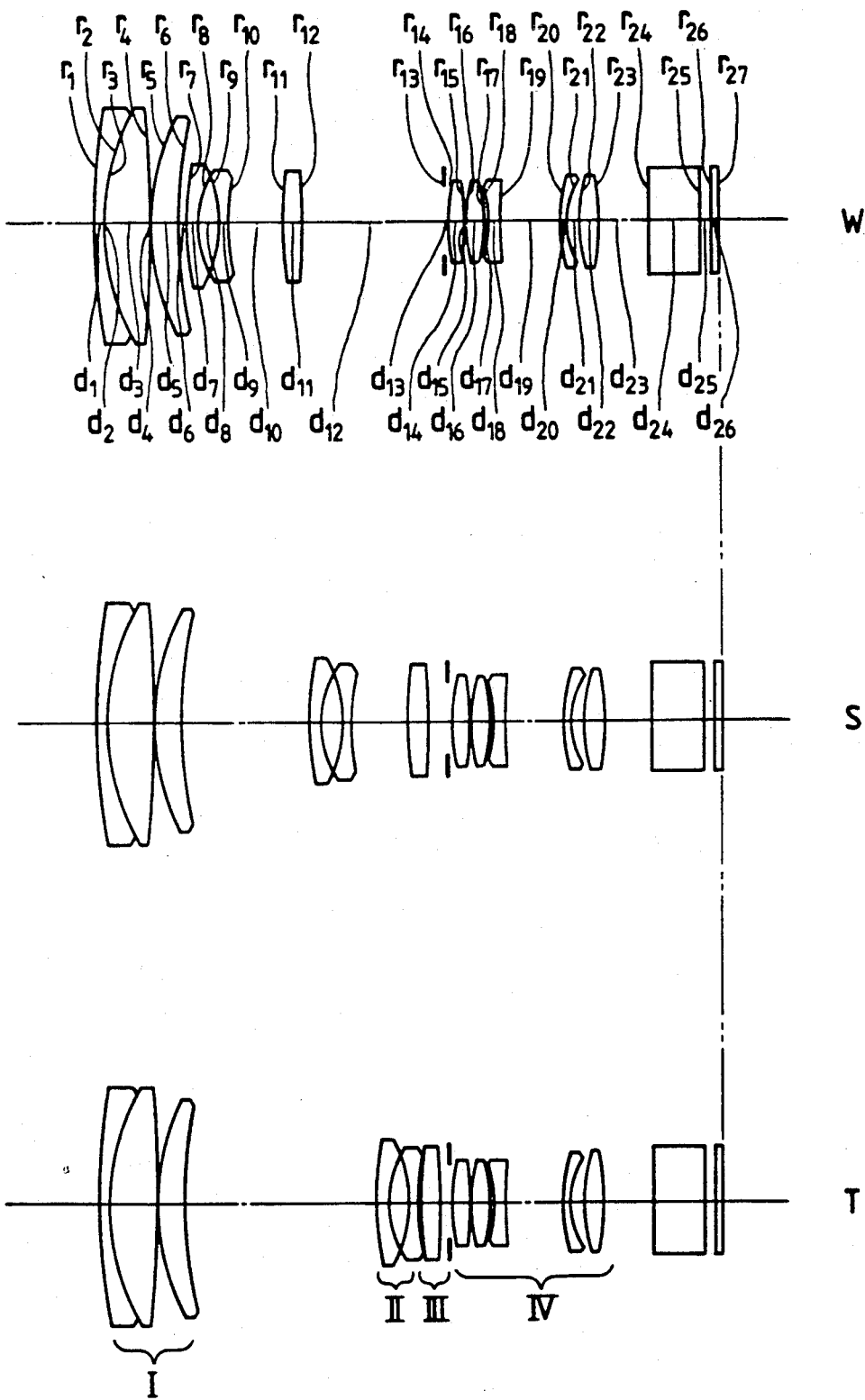

Embodiment 5 has the composition which is illustrated in FIG. 5 and similar to that of Embodiment 4, and uses a GRIN lens having the function substantially the same as that of the GRIN lens adopted in Embodiment 4. However, Embodiment 5 has a total length shorter than that of Embodiment 4.

Figure 6:
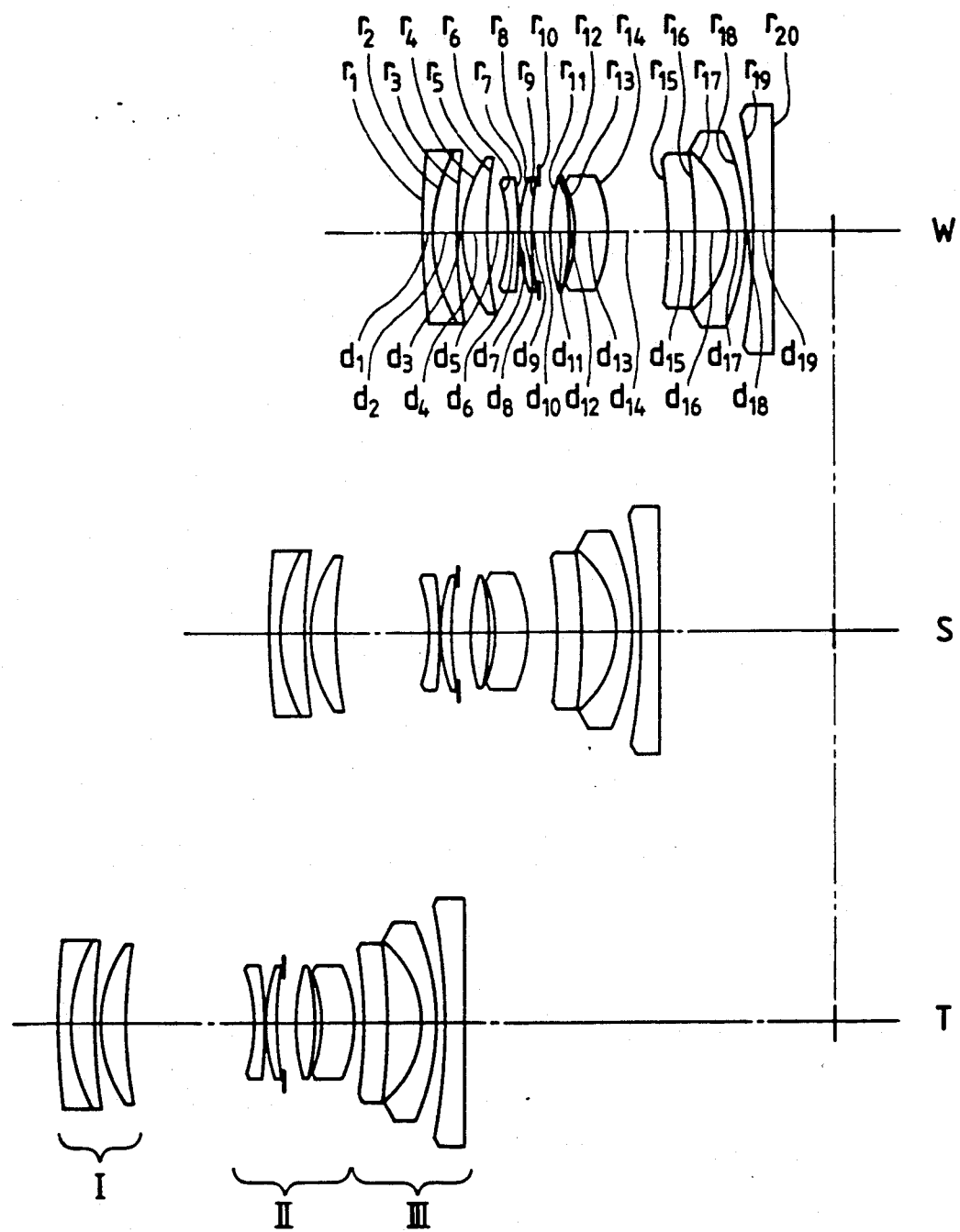

Embodiment 6 is designed as a vari-focal lens system which has the composition illustrated in FIG. 6 and comprises a first lens unit I having a positive refractive power, a second lens unit II having positive refractive power and a third lens unit III having a negative refractive power, and is designed for a vari-focal ratio of approximately 3. In the Embodiment 6, the third lens unit III (the negative lens unit arranged on the extreme image side) is composed of three lens elements all of which have negative refractive powers for shortening the total length of the lens system and the lens element arranged on the extreme object side among the lens elements is designed as a GRIN lens which has a negative refractive power of the medium thereof and a negative refractive power as a whole.

In a lens system wherein the lens unit arranged on the extreme image side has the negative refractive power, the positive distortion and the spherical aberration are aggravated at the wide position and the tele position respectively. Especially when an attempt is made to shorten the total length of the lens system at the wide position thereof, the positive distortion is produced remarkably.

In Embodiment 6, curvature on the surface the GRIN lens is lowered to reduce production of the positive distortion since the GRIN lens having the negative refractive power of the medium thereof is used in the third lens unit having the negative lens unit III and the positive distortion is corrected by producing negative distortion by the medium of the GRIN lens.

In order to favorably correct the above-mentioned distortion, it is desirable to satisfy the following condition (9):

(9) $0 < n_{1d}(f_w)^2 < 15$

If the lower limit of the condition (9) is exceeded, the medium of the GRIN lens will have a positive refractive power and it will be obliged to strengthen the refractive power of the surface thereof, thereby making it impossible to correct the distortion produced by the surface.

By designing the GRIN lens so as to have the refractive index distribution satisfying the conditions (3) and (4), Embodiment 6 favorably corrects the longitudinal chromatic aberration with the positive longitudinal chromatic aberration produced by the medium of the GRIN lens though the third lens unit III comprises no positive lens element.

The Embodiment 6 uses a GRIN lens having the positive refractive power of the medium thereof as the positive lens element arranged on the extremely image side in the second lens unit having the positive refractive power. The medium of this GRIN lens serves for lowering curvature of the surface thereof and correcting the negative spherical aberration remarkably especially at the tele position by producing the positive spherical aberration with the medium thereof.

As is understood from the foregoing description, Embodiment 6 is designed as a very compact vari-focal lens system having a vari-focal ratio of approximately 3 and a telephoto ratio of 1.38 at the tele position by using the GRIN lens which satisfies the conditions (3), (4) and (9) and is made of the medium having the negative refractive power in the third negative lens unit III arranged on the extremely image side.

Embodiment 7 is designed as a vari-focal lens system which has the composition illustrated in FIG. 7, comprises, in the order from the object side, a first lens unit I having a positive refractive power, a second lens unit II having positive refractive power and a third lens unit III having a negative refractive power, and is designed for a vari-focal ratio of approximately 3.

Also in Embodiment 7, the lens element arranged on the extremely object side in the third lens unit III having the negative refractive power is designed as a GRIN lens which satisfies the conditions (3), (4) and (9), and is made of a medium having a negative refractive power.

In the Embodiment 7, most of the negative refractive power is imparted to the medium of the GRIN lens to lower curvature on the surface thereof so that the positive distortion and the negative longitudinal chromatic aberration are minimized, and the third negative lens unit can be composed only of two lens elements.

Also in Embodiment 7, the positive lens element arranged on the extreme image side in the second positive lens unit II is designed as a GRIN lens made of a medium having a positive refractive power for correcting the spherical aberration at the tele position. Embodiment 7 is a very compact vari-focal lens system having a telephoto ratio of 1.38 at the wide position.

Figure 8:
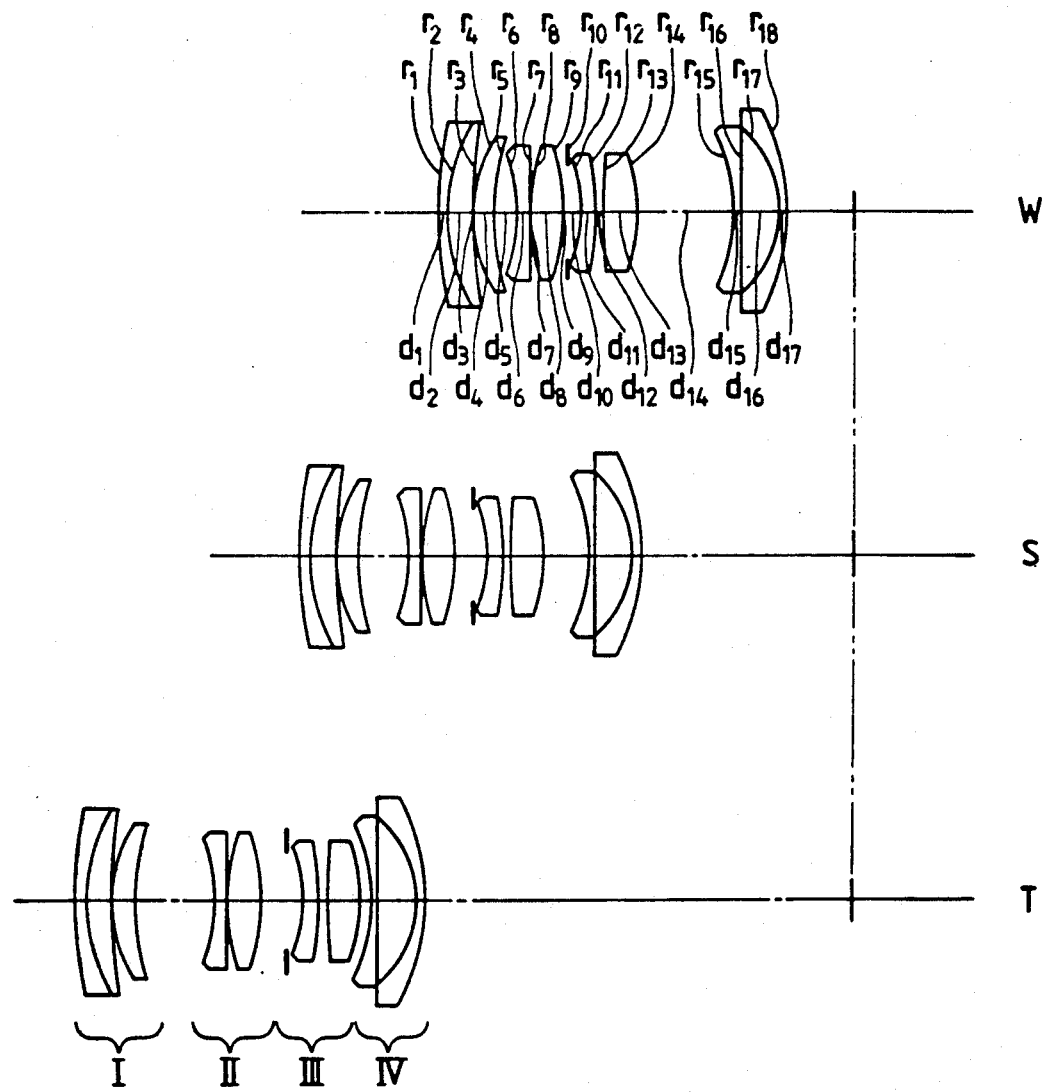

Embodiment 8 is a vari-focal lens system which has the composition illustrated in FIG. 8 and comprise, in the order from the object side, a first lens unit I having a positive refractive power, a second lens unit II having a positive refractive power, a third lens unit III having a positive refractive power and a fourth lens unit IV having a negative refractive power, and is designed for a vari-focal ratio of approximately 3.

In Embodiment 8, the lens unit which is arranged on the extreme image side and has the negative refractive power (the fourth lens unit IV) is composed of two lens elements, as in Embodiment 7, but both of these lens elements are designed as GRIN lenses having positive refractive powers of media thereof for further lowering the telephoto ratio at the wide position.

When the telephoto ratio is lowered at the wide position, the positive distortion and astigmatism are aggravated especially at the wide position. In order to reduce the distortion and astigmatism, it is desirable to design the lens elements so as to have shapes concentric with regard to the stop. For this reason, each of the two lens elements of the fourth lens unit IV is designed as a negative meniscus lens element having a concave surface on the object side. Even when the lens elements have such shapes, however, the lens surfaces produce remarkable distortion which cannot be reduced sufficiently with homogenous lens elements. Therefore, these lens elements are designed as the GRIN lenses for sufficiently reducing the distortion. Originally, GRIN lenses are designed to be used in the fourth lens unit IV having the negative refractive power so as to have negative refractive powers of media for lowering curvature on these surfaces or reducing production amounts of aberrations. However, such negative refractive powers of the media will produce too large a difference between refractive indices of the media which is undesirable for the Embodiment 8 wherein a strong refractive power is to be obtained with a small number of lens elements. In addition, when the media have the negative refractive powers, there will be produced a vicious cycle that positive distortion is produced by the correcting terms of the refractive index distribution formula for the refractive index distributions formed on the surfaces of the GRIN lenses.

In the Embodiment 8, the negative refractive power of the fourth lens unit is borne by the surfaces of the GRIN lenses, and the shapes of these surfaces are designed so as to be concentric with regard to the stop for reducing production amounts of astigmatism and positive distortion. However, since the distortion cannot be reduced sufficiently by the shapes of the surfaces of the GRIN lenses, these lenses are made of media having positive refractive powers so that the distortion is favorably corrected with the negative distortion produced by the correcting terms of the refractive index distribution formula for the refractive index distributions formed on the surfaces of the GRIN lenses.

These GRIN lenses satisfy the conditions (1) and (2), and produce positive longitudinal chromatic aberration to cancel the negative longitudinal chromatic aberration. Further, the Embodiment 8 corrects spherical aberration which is apt to be produced especially on the negative side at the tele position by using, on the positive lens element arranged on the extremely image side in the third lens unit having the positive refractive power, an aspherical surface having positive refractive power weakened as the surface portions are farther from the optical axis.

Owing to the design described above, Embodiment 8 is a very compact vari-focal lens system having a telephoto ratio of 1.24 at the wide position regardless of its vari-focal ratio of approximately 3.

Figure 9:
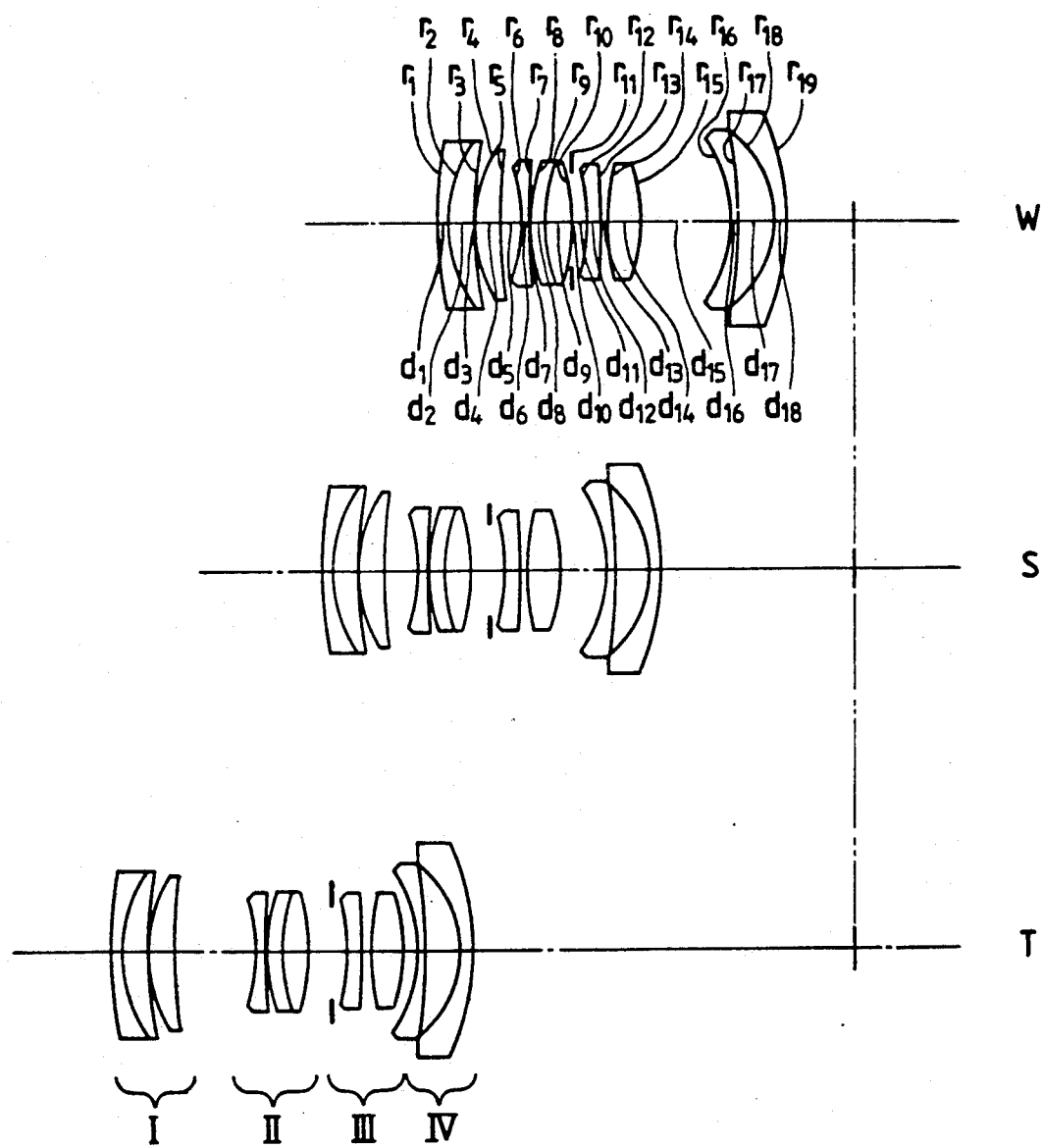

Embodiment 9 is a vari-focal lens system which has the composition illustrated in FIG. 9 and comprises, in the order from the object side, a first lens unit I having a positive refractive power, a second lens unit II having a positive refractive power, a third lens unit III having a positive refractive power and a fourth lens unit IV having a negative refractive power, and is designed for a vari-focal ratio of approximately 3. Though the Embodiment has a telephoto ratio of 1.23 at the wide position thereof which is substantially the same as that of the vari-focal lens system preferred as Embodiment 8, Embodiment 9 has a telephoto ratio of 0.79 at the tele position thereof which is lower than that of Embodiment 8, i.e., 0.84.

Embodiment 9 uses only one GRIN lens.

Like Embodiment 8, Embodiment 9 uses the fourth lens unit IV which is composed of negative meniscus lens elements having concave surfaces on the object side, and the GRIN lens used in the fourth lens unit IV is made of a medium having a positive refractive power. The GRIN lens has the function which is substantially the same as that of the GRIN lens used in Embodiment 8, but the medium of the GRIN lens used in Embodiment 9 must have a higher refractive power for enhancing the capability to correct the positive distortion and the negative longitudinal chromatic aberration since the GRIN lens is omitted in Embodiment 9 as compared with Embodiment 8. For this purpose, it is desirable that the GRIN lens to be used in Embodiment 9 satisfies the following condition (10):

(10) $-15 < n_{1d} \cdot (f_w)^2 < 0$

In the lower limit of the condition (10) is exceeded, the medium of the GRIN lens will have too strong a refractive power and it will be obliged to strengthen curvature on the surface thereof for obtaining the required refractive power, thereby allowing the surface to produce aberrations too remarkable for correction. If the upper limit of the condition (10) is exceeded, the medium of the GRIN lens will have a negative refractive power, thereby making it impossible to correct the positive distortion.

It is possible to correct the aberrations by designing, as the GRIN lens, either of the lens elements arranged in the fourth lens unit IV having the negative refractive power. However, it is effective to design the lens element arranged on the extreme object side in the fourth lens unit IV as the GRIN lens, because Embodiment 9 is a high vari-focal ratio lens system in which the spherical aberration and longitudinal chromatic aberration are varied remarkably at the tele position, and the marginal ray is the highest, at the tele position, on the lens element arranged on the extremely object side in the fourth lens unit IV having negative refractive power.

Like Embodiment 8, Embodiment 9 is designed so as to correct the spherical aberration which is apt to be produced especially on the negative side at the tele position by using, on the positive lens element arranged on the extreme image side in the third positive lens unit III, an aspherical surface having positive refractive power weakened as the surface portions are farther from the optical axis.

As is understood from the foregoing description, Embodiment 9 is designed as a very compact vari-focal lens system which has a vari-focal ratio of approximately 3, a telephoto ratio of 1.23 at the wide position and a telephoto ratio of 0.79 at the tele position by using at least one GRIN lens satisfying the conditions (3), (4) and (10) in the fourth lens unit IV having negative refractive power.

Figure 10:
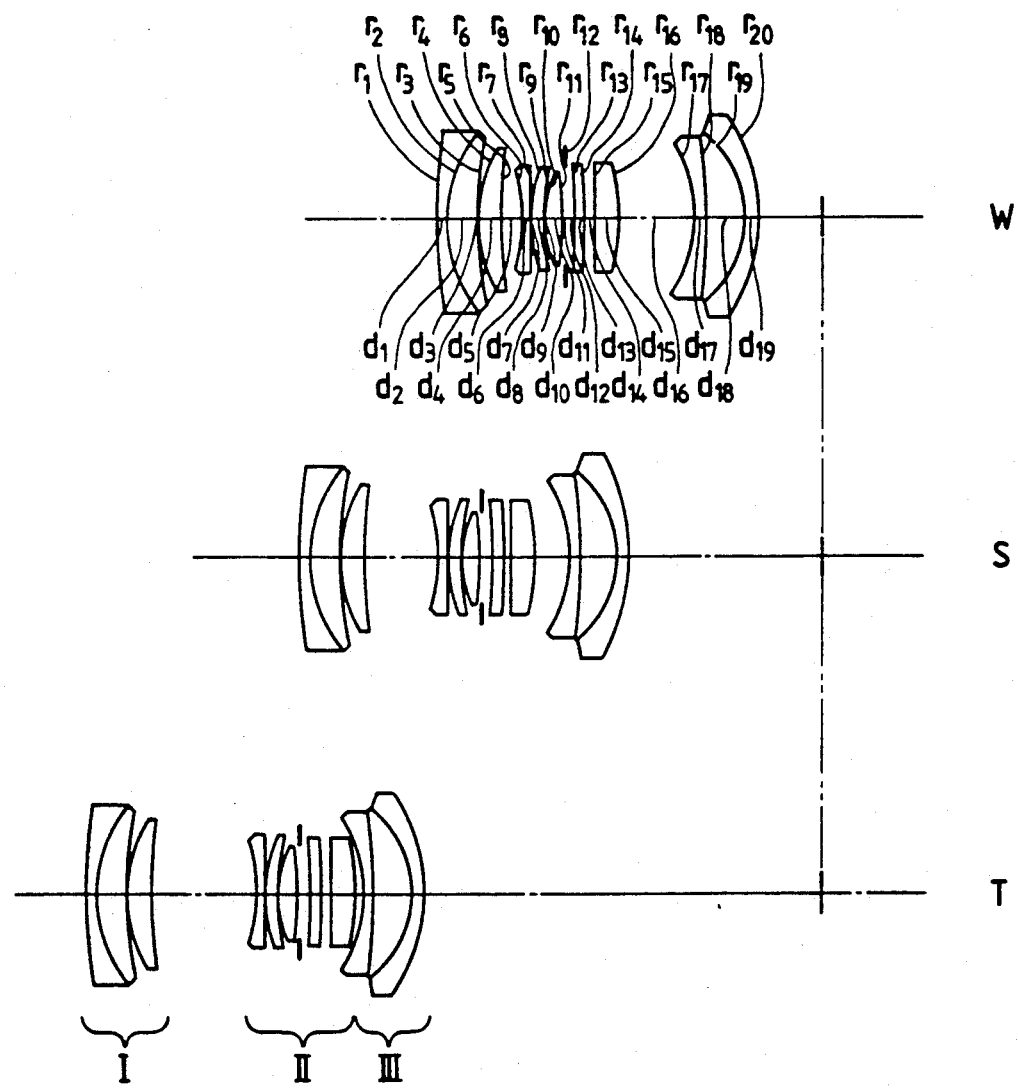
Figure 15:
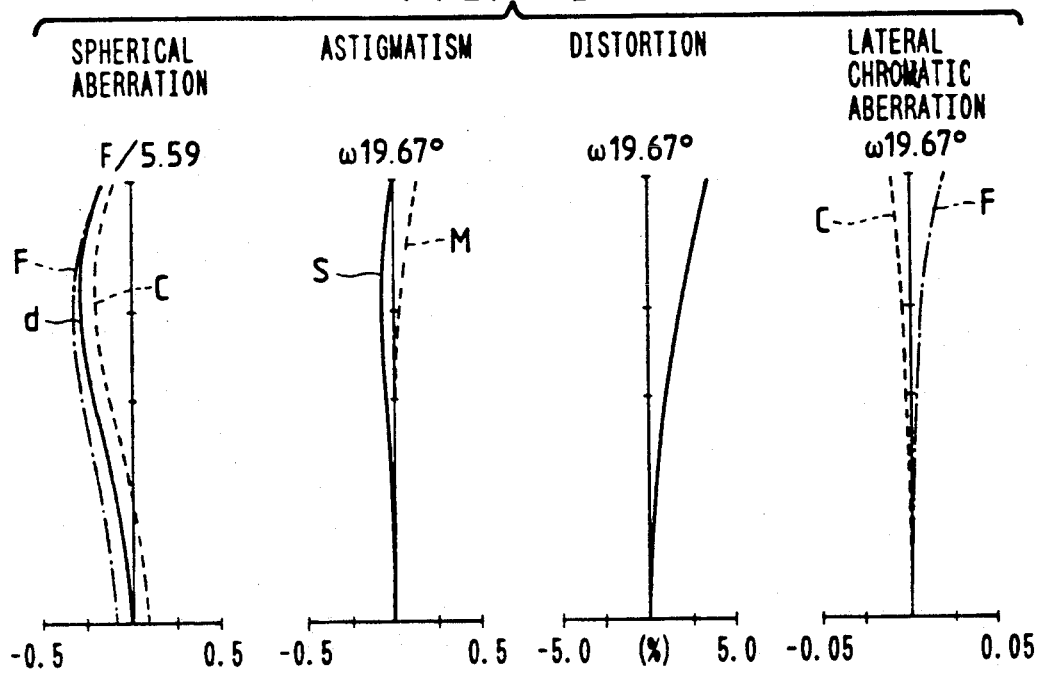
Figure 16:
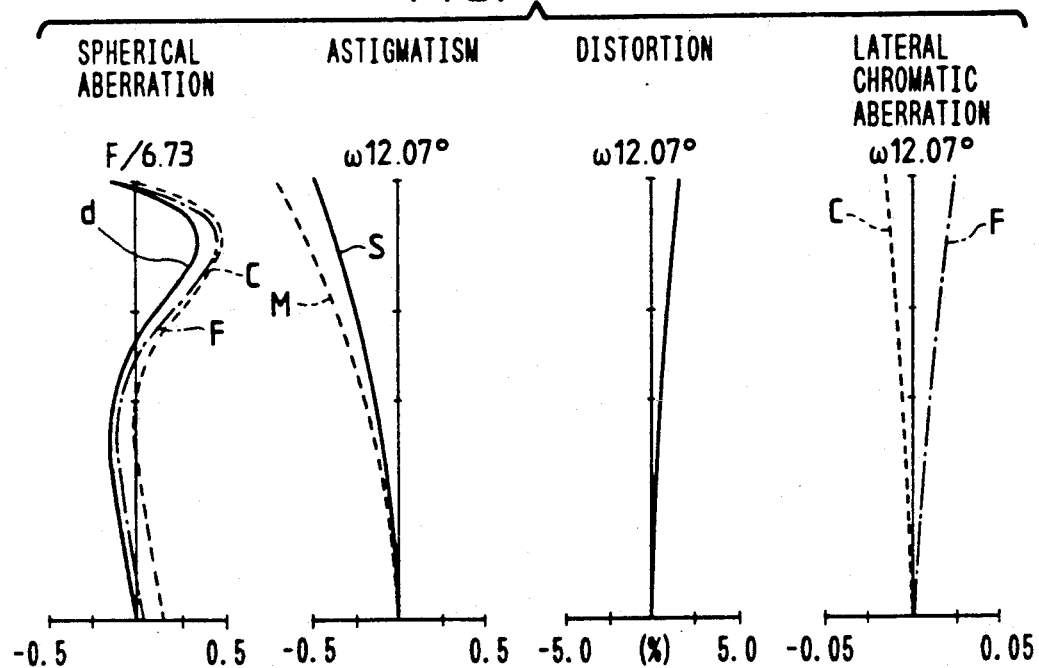
Figure 21:
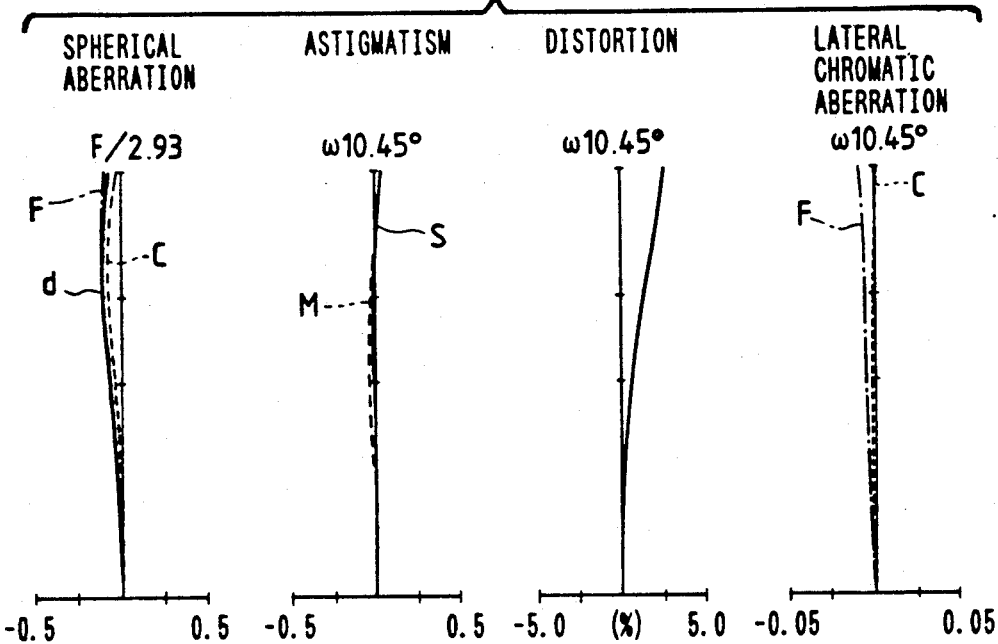
Figure 22:
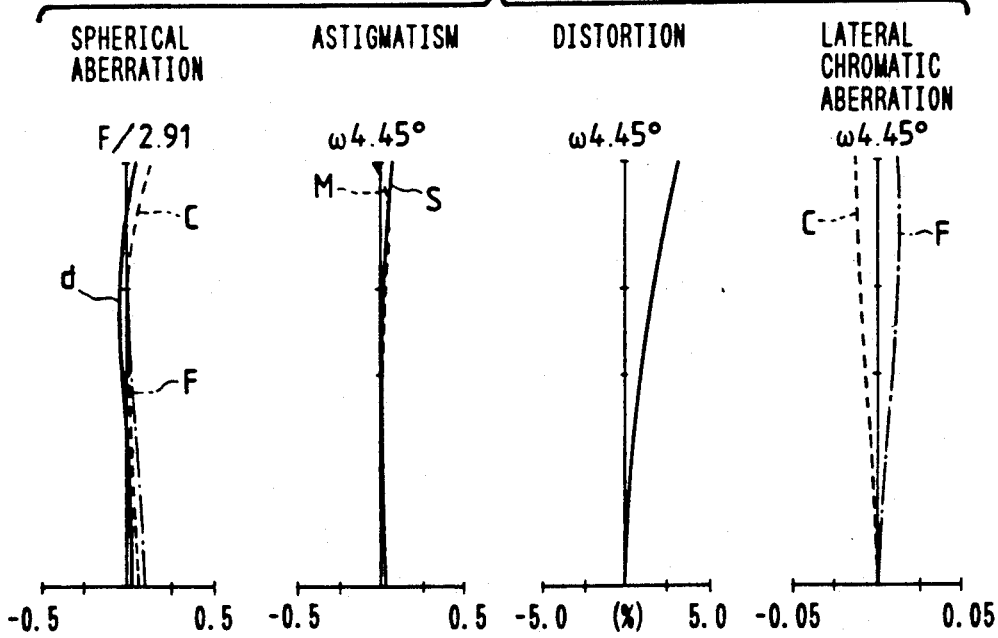
Figure 27:
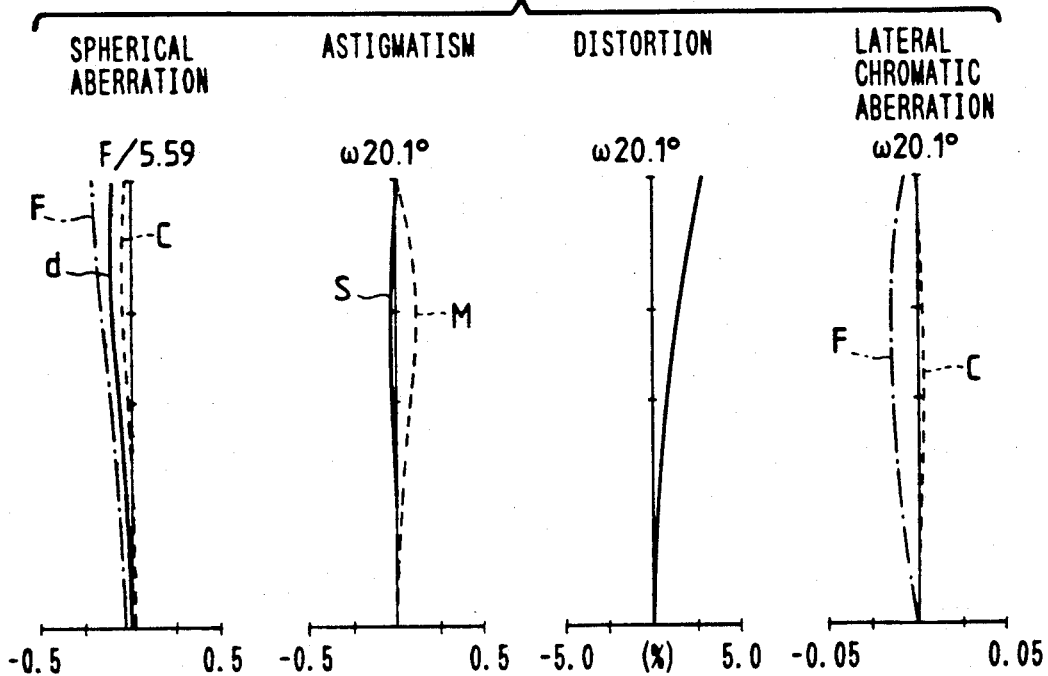
Figure 28:
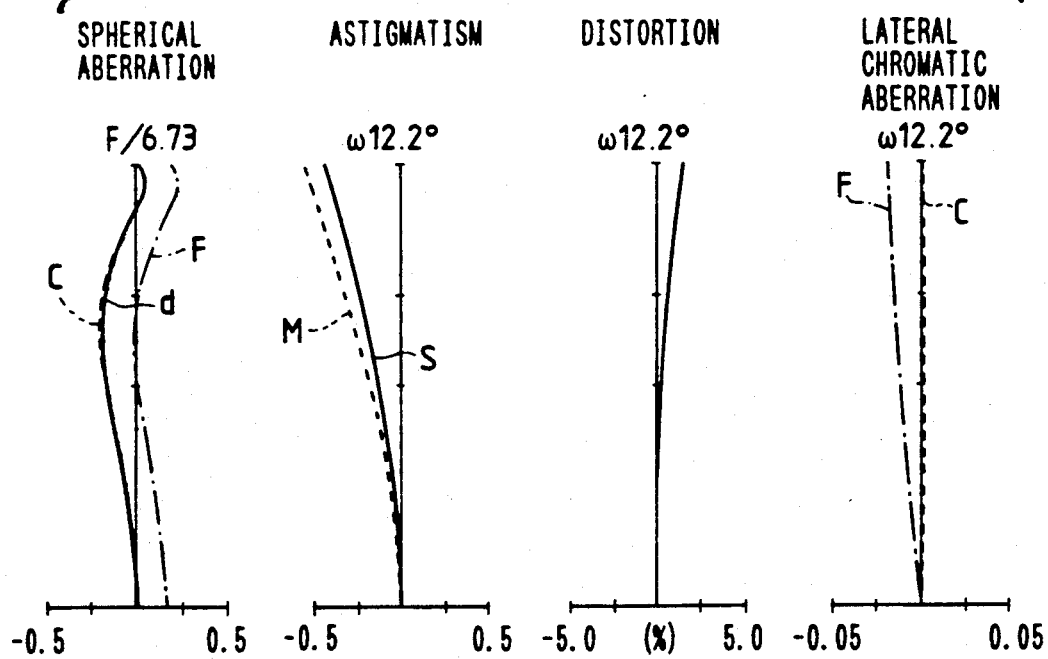
Figure 31:
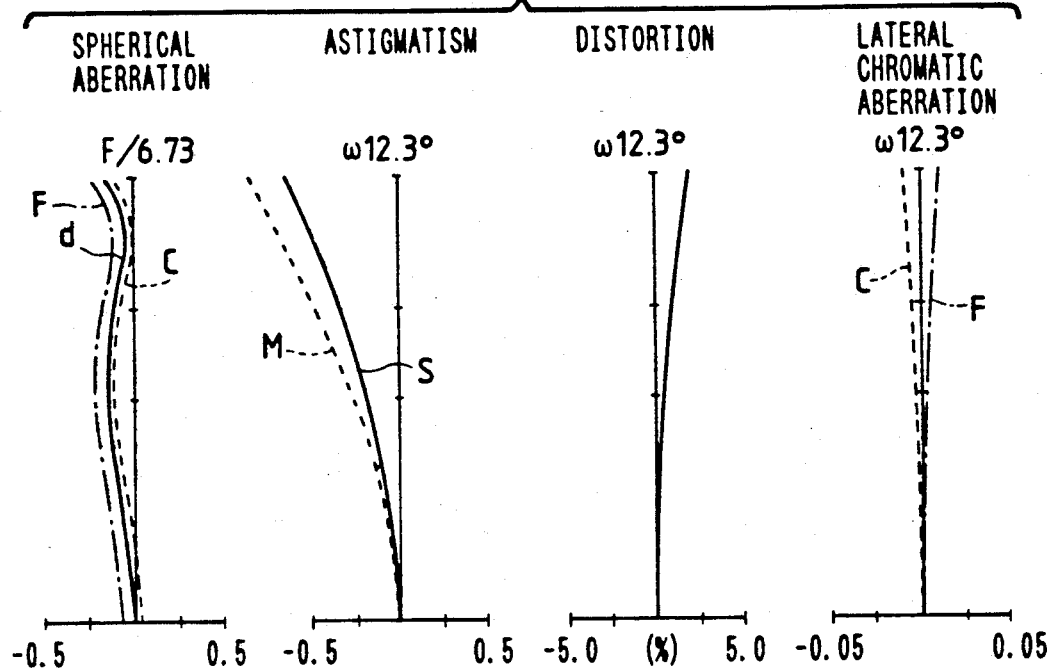
Figure 32:
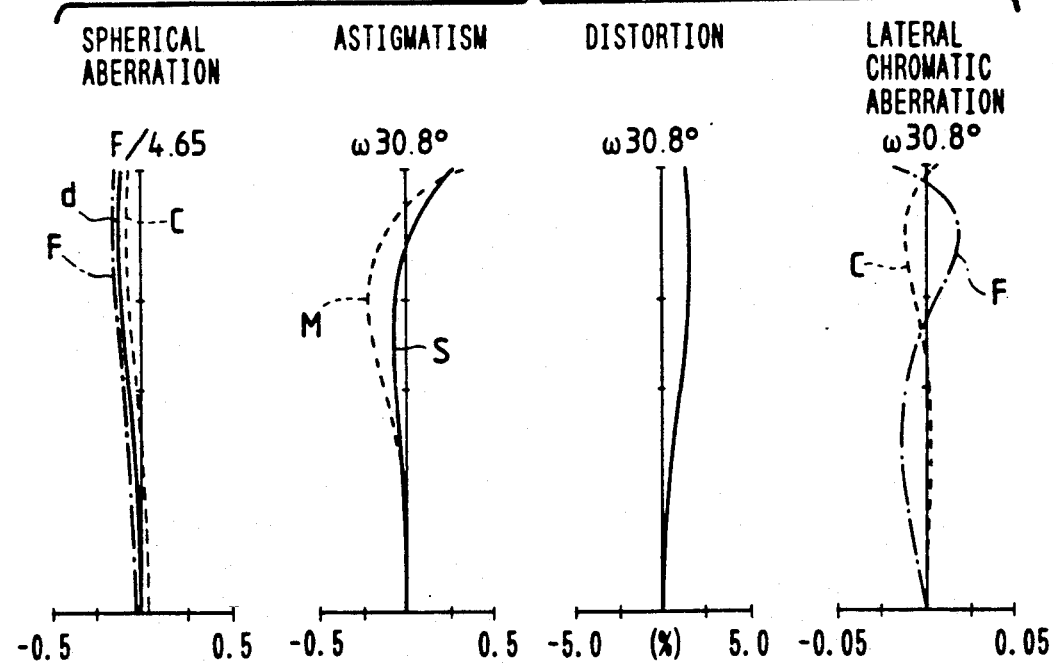
Figure 37:
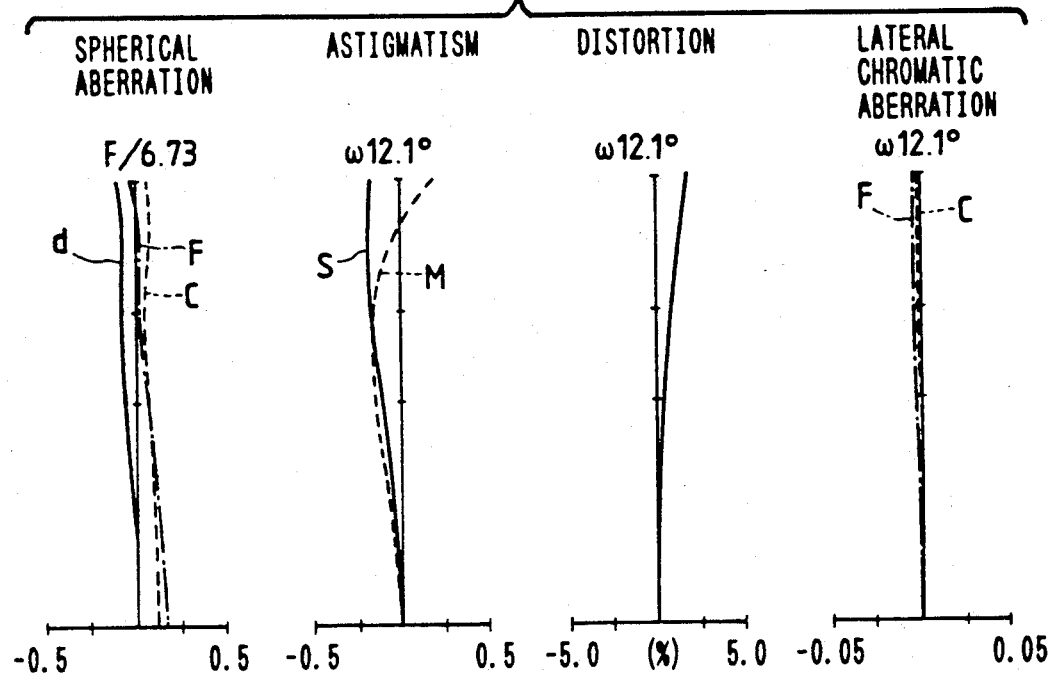
Figure 38:
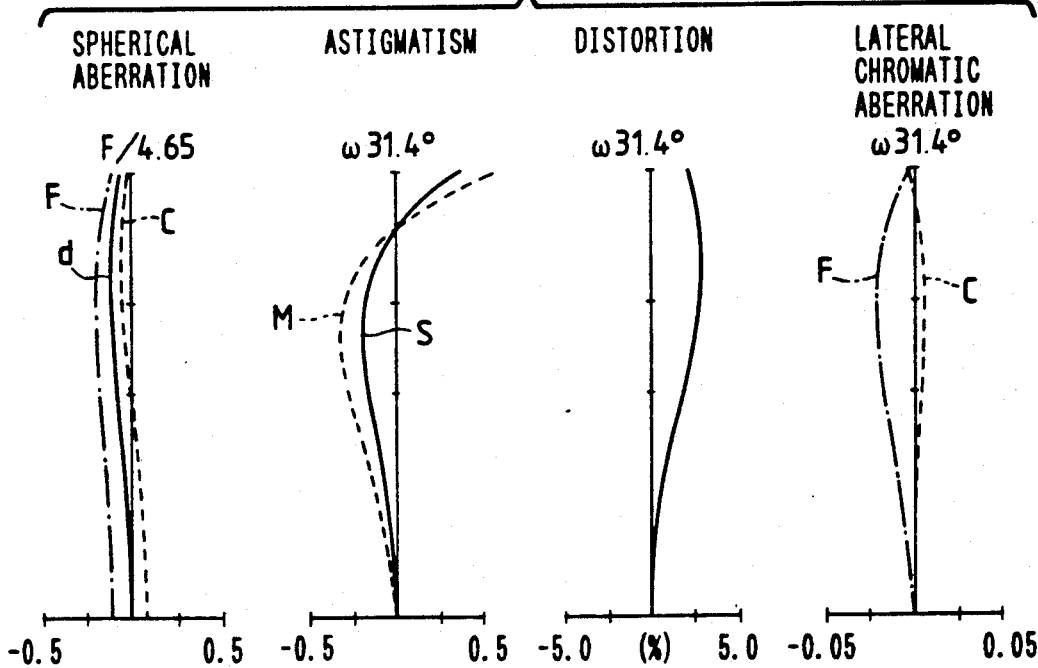
FIG. 38 through FIG. 40 show graphs illustrating aberration characteristics at the wide position, intermediate focal length and tele position of the Embodiment 10 of the present invention.
Figure 39:
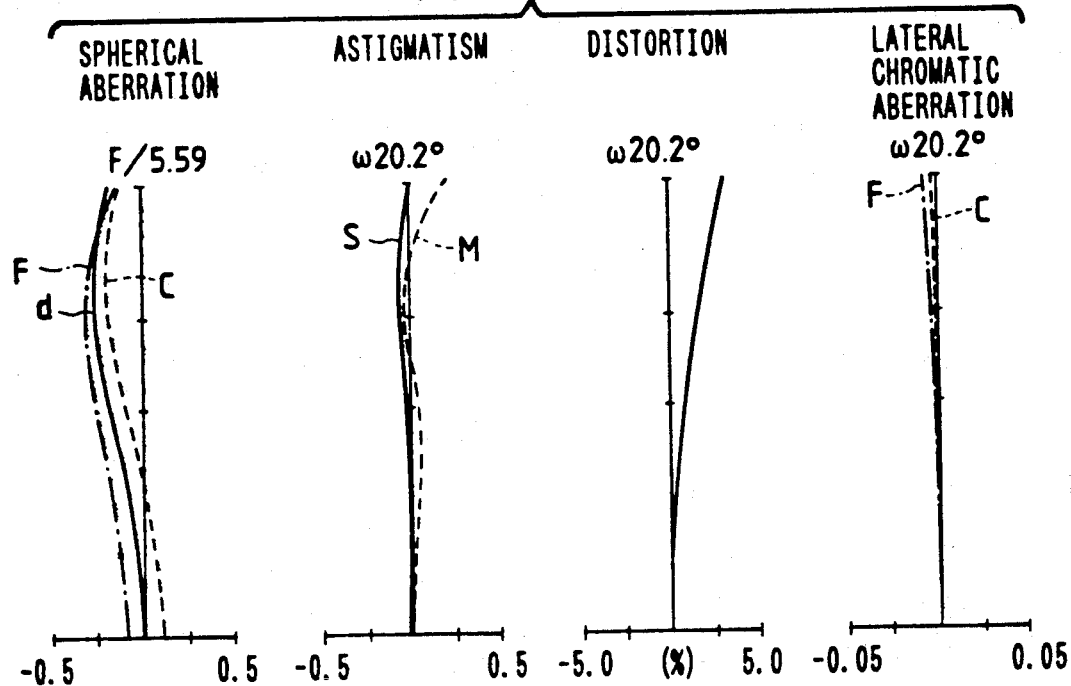
Figure 40:
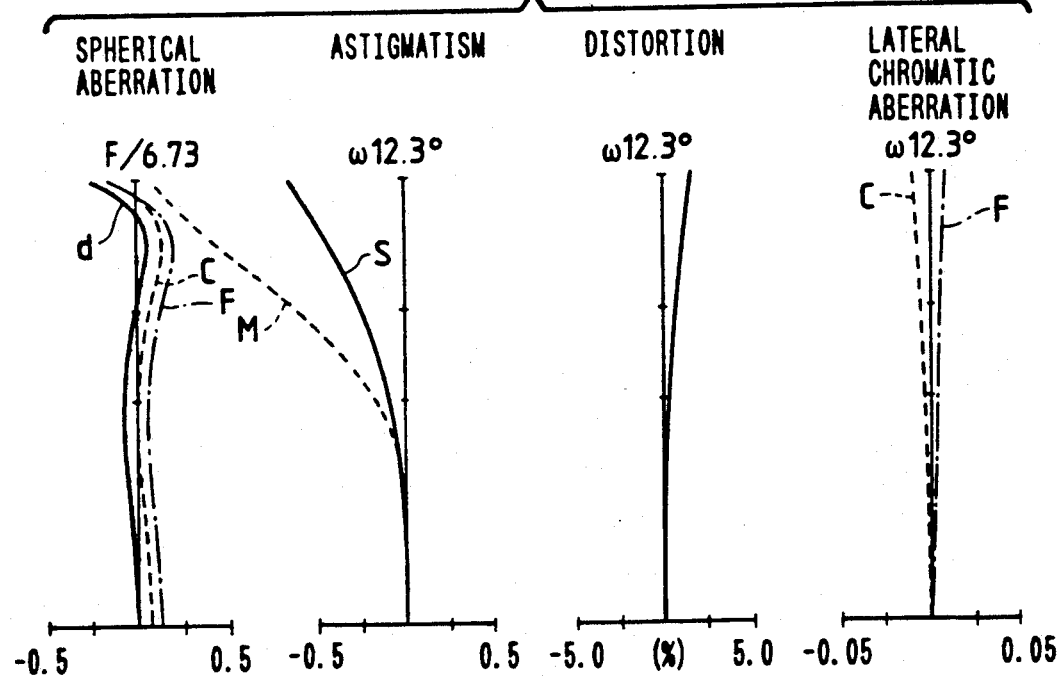

Embodiment 10 is a vari-focal lens system which has the composition illustrated in FIG. 10 and comprises, in the order from the object side, a first lens unit I having a positive refractive power, a second lens unit II having a positive refractive power and a third lens unit III having a negative refractive power, and is designed for a vari-focal ratio of approximately 3.

Like Embodiment 9, Embodiment 10 adopts at least one GRIN lens satisfying the conditions (3), (4) and (10) in the lens unit which has the negative refractive power and is arranged on the extremely image side (the third lens unit III) for compact design of the vari-focal lens system. Embodiment 10 has a telephoto ratio of 1.16 at the wide position thereof. The function of the GRIN lens adopted in the third lens unit III of Embodiment 10 is substantially the same as that of the GRIN lens used in Embodiment 8.

Further, in Embodiment 10, the positive less element arranged on the extremely image side in the second positive lens unit II is designed as a GRIN lens having such a refractive index distribution as to select a negative refractive power for the medium thereof. The medium of this GRIN lens serves for correcting the coma within the range from the wide position to the tele position and the spherical aberration which is apt to be produced on the negative side at the tele position.

It is possible, in Embodiment 10, to correct the spherical aberration at the tele position more favorably by using, in the first positive lens unit I, an aspherical surface having positive refractive power weakened as the surface portions are farther from the optical axis.

As is understood from the foregoing description, the Embodiment 10 is designed as an ultra-compact vari-focal lens system having the telephoto ratio of 1.16 at the wide position though it is composed of the three lens units.

Now, the numerical data of the Embodiments will be described below:

Embodiment 1

$f = 36.2 \sim 101.15$ mm, $F/4.65 \sim F/6.73$
$2\omega = 60.29° \sim 23.72°$

| | | | |
|---|---|---|---|
| $r_1 = 44.5092$ | $d_1 = 1.0763$ | $n_{01} = 1.83481$ | $\nu_{01} = 42.72$ |
| $r_2 = 14.0951$ | $d_2 = 2.8172$ | $n_{02} = 1.69680$ | $\nu_{02} = 55.52$ |
| $r_3 = 39.3826$ | $d_3 = 0.1200$ | | |
| $r_4 = 14.9706$ | $d_4 = 2.6000$ | $n_{03} = 1.61700$ | $\nu_{03} = 62.79$ |
| $r_5 = 52.4777$ | $d_5 = D_1$ (variable) | | |
| $r_6 = -21.7425$ | $d_6 = 0.7647$ | $n_{04} = 1.77250$ | $\nu_{04} = 49.66$ |
| $r_7 = 48.0383$ | $d_7 = 0.1500$ | | |
| $r_8 = 19.9553$ | $d_8 = 1.8131$ | $n_{05} = 1.84666$ | $\nu_{05} = 23.78$ |
| $r_9 = 20.2452$ | $d_9 = 2.5538$ | $n_{06} = 1.61700$ | $\nu_{06} = 62.79$ |
| $r_{10} = -23.6155$ | $d_{10} = D_2$ (variable) | | |
| $r_{11} = \infty$ (stop) | $d_{11} = 1.6286$ | | |
| $r_{12} = -17.1887$ | $d_{12} = 1.4800$ | $n_{07} = 1.80440$ | $\nu_{07} = 39.58$ |
| $r_{13} = -64.0550$ | $d_{13} = 0.8349$ | | |
| $r_{14} = 27.6723$ | $d_{14} = 3.6406$ | $n_{08} = 1.61700$ | $\nu_{08} = 62.79$ |
| $r_{15} = -17.1596$ (aspherical surface) | $d_{15} = D_3$ (variable) | | |
| $r_{16} = -14.9073$ | $d_{16} = 1.1041$ | $n_{09}$ (granded refractive index lens) | |
| $r_{17} = -40.5458$ | $d_{17} = 3.7060$ | | |
| $r_{18} = -11.8036$ | $d_{18} = 1.1064$ | $n_{010} = 1.77250$ | $\nu_{010} = 49.66$ |
| $r_{19} = -28.7675$ | | | | aspherical coefficient
$P = 1.0000, A_4 = 0.10401 \times 10^{-3}$
$A_6 = 0.70196 \times 10^{-7}, A_8 = 0.32121 \times 10^{-8}$

| f | 36.2 | 60.5 | 101.15 |
|---|---|---|---|
| $D_1$ | 2.303 | 3.881 | 8.783 |
| $D_2$ | 0.201 | 2.421 | 2.940 |
| $D_3$ | 9.527 | 4.987 | 1.392 | graded refractive index lens

| | $n_0$ | $n_1$ |
|---|---|---|
| d line | 1.69895 | $-0.24119 \times 10^{-2}$ |
| C line | 1.69223 | $-0.22340 \times 10^{-2}$ |
| F line | 1.71543 | $-0.28271 \times 10^{-2}$ |

| | $n_2$ | $n_3$ |
|---|---|---|
| d line | $-0.15638 \times 10^{-5}$ | $-0.62451 \times 10^{-8}$ |
| C line | $-0.44923 \times 10^{-5}$ | $0.13564 \times 10^{-7}$ |
| F line | $0.52696 \times 10^{-5}$ | $-0.52466 \times 10^{-7}$ |

$\phi_M/\phi_H = -0.172, \phi_G/\phi_n = 0.369$
$n^1_d(f_w)^2 = -3.161$

Embodiment 2

$f = 36.2 \sim 101.15$ mm, $F/4.65 \sim F/6.73$
$2\omega = 61.72° \sim 24.14°$

| | | | |
|---|---|---|---|
| $r_1 = 84.2003$ | $d_1 = 1.0763$ | $n_{01} = 1.83481$ | $\nu_{01} = 42.72$ |
| $r_2 = 20.2435$ | $d_2 = 2.8423$ | $n_{02} = 1.69680$ | $\nu_{02} = 56.49$ |
| $r_3 = 41.0150$ | $d_3 = 0.1200$ | | |
| $r_4 = 13.3301$ (aspherical surface) | $d_4 = 2.6237$ | $n_{03} = 1.61700$ | $\nu_{03} = 62.79$ |
| $r_5 = 52.0159$ | $d_5 = D_1$ (variable) | | |
| $r_6 = -18.2228$ | $d_6 = 0.8010$ | $n_{04} = 1.77250$ | $\nu_{04} = 49.66$ |
| $r_7 = 166.7294$ | $d_7 = 0.1905$ | | |
| $r_8 = 24.9822$ | $d_8 = 1.2000$ | $n_{05} = 1.84666$ | $\nu_{05} = 23.78$ |
| $r_9 = 19.8654$ | $d_9 = 0.1200$ | | |
| $r_{10} = 13.6936$ | $d_{10} = 2.000$ | $n_{06} = 1.56384$ | $\nu_{06} = 60.69$ |
| $r_{11} = -37.2425$ | $d_{11} = 0.4673$ | | |
| $r_{12} = \infty$ (stop) | $d_{12} = 1.3253$ | | |
| $r_{13} = -67.6110$ | $d_{13} = 1.2000$ | $n_{07} = 1.80400$ | $\nu_{07} = 46.57$ |
| $r_{14} = -50.3303$ | $d_{14} = 0.7686$ | | |
| $r_{15} = 89.3118$ | $d_{15} = 2.8638$ | $n_{08}$ (graded refractive index lens 1) | |
| $r_{16} = -29.7033$ | $d_{16} = D_2$ (variable) | | |
| $r_{17} = -15.2886$ | $d_{17} = 1.2521$ | $n_{09}$ (graded refractive index lens 2) | |
| $r_{18} = -61.8509$ | $d_{18} = 3.9186$ | | |
| $r_{19} = -10.9575$ | $d_{19} = 1.2522$ | $n_{010} = 1.77250$ | $\nu_{010} = 49.66$ |
| $r_{20} = -19.9448$ | | | | aspherical coefficient
$P = 1.0000, A_4 = -0.11828 \times 10^{-4}$
$A_6 = -0.46928 \times 10^{-7}, A_8 = -0.25549 \times 10^{-9}$

| f | 36.2 | 60.5 | 101.15 |
|---|---|---|---|
| $D_1$ | 2.371 | 7.992 | 11.170 |
| $D_2$ | 8.608 | 4.106 | 1.001 | graded refractive index lens 1

| | $n_0$ | $n_1$ |
|---|---|---|
| d line | 1.60311 | $0.30558 \times 10^{-4}$ |
| C line | 1.60008 | $0.30181 \times 10^{-4}$ |
| F line | 1.61002 | $0.31438 \times 10^{-4}$ |

| | $n_2$ | $n_3$ |
|---|---|---|
| d line | $0.26465 \times 10^{-4}$ | $0.61278 \times 10^{-6}$ |
| C line | $0.26014 \times 10^{-4}$ | $0.60700 \times 10^{-6}$ |
| F line | $0.27518 \times 10^{-4}$ | $0.62627 \times 10^{-6}$ | graded refractive index lens 2

| | $n_0$ | $n_1$ |
|---|---|---|
| d line | 1.69895 | $-0.15538 \times 10^{-2}$ |
| C line | 1.69223 | $-0.14114 \times 10^{-2}$ |
| F line | 1.71543 | $-0.18930 \times 10^{-2}$ |

| | $n_2$ | $n_3$ |
|---|---|---|
| d line | $-0.10118 \times 10^{-4}$ | $0.31305 \times 10^{-7}$ |
| C line | $-0.12440 \times 10^{-4}$ | $0.47557 \times 10^{-7}$ |
| F line | $-0.46999 \times 10^{-5}$ | $-0.66162 \times 10^{-8}$ |

$\phi_M/\phi_H = -0.118, \phi_G/\phi_n = 0.469$
$n_{1d}(f_w)^2 = -2.036$

Embodiment 3

$f = 9.27 \sim 52.36$ mm, $F/2.9$
$2\omega = 50.48° \sim 8.82°$

| | | | |
|---|---|---|---|
| $r_1 = 76.6451$ | $d_1 = 1.0000$ | $n_{01} = 1.84666$ | $\nu_{01} = 23.78$ |
| $r_2 = 27.0233$ | $d_2 = 0.2330$ | | |
| $r_3 = 26.7193$ | $d_3 = 4.2000$ | $n_{02} = 1.77250$ | $\nu_{02} = 49.66$ |
| $r_4 = -191.0685$ | $d_4 = 0.1500$ | | |
| $r_5 = 28.4222$ | $d_5 = 2.8000$ | $n_{03} = 1.74100$ | $\nu_{03} = 52.68$ |
| $r_6 = 59.6488$ | $d_6 = D_1$ (variable) | | |
| $r_7 = -417.3327$ | $d_7 = 1.0358$ | $n_{04} = 1.77250$ | $\nu_{04} = 49.66$ |
| $r_8 = 10.3383$ | $d_8 = 2.1000$ | | |
| $r_9 = -15.6341$ | $d_9 = 1.3650$ | $n_{05}$ (graded refractive index lens) | |
| $r_{10} = -28.6667$ | $d_{10} = D_2$ (variable) | | |
| $r_{11} = -56.7484$ | $d_{11} = 1.0165$ | $n_{06} = 1.72916$ | $\nu_{06} = 54.68$ |
| $r_{12} = 84.5469$ | $d_{12} = D_3$ (variable) | | |
| $r_{13} = \infty$ (stop) | $d_{13} = 0.3091$ | | |
| $r_{14} = 14.3583$ | $d_{14} = 1.8500$ | $n_{07} = 1.77250$ | $\nu_{07} = 49.66$ |
| $r_{15} = -56.9419$ | $d_{15} = 0.8779$ | | |
| $r_{16} = 18.3068$ | $d_{16} = 1.8000$ | $n_{08} = 1.77250$ | $\nu_{08} = 49.66$ |
| $r_{17} = -19.2416$ | $d_{17} = 0.5000$ | | |
| $r_{18} = -13.3962$ | $d_{18} = 1.2104$ | $n_{09} = 1.84666$ | $\nu_{09} = 23.78$ |
| $r_{19} = 53.8736$ | $d_{19} = 6.1299$ | | |
| $r_{20} = 11.4516$ | $d_{20} = 0.8201$ | $n_{010} = 1.80440$ | $\nu_{010} = 39.58$ |
| $r_{21} = 6.8731$ | $d_{21} = 4.8077$ | | |
| $r_{22} = 14.2505$ | $d_{22} = 2.0000$ | $n_{011} = 1.77250$ | $\nu_{011} = 49.66$ |
| $r_{23} = -79.6158$ | $d_{23} = 5.0000$ | | |
| $r_{24} = \infty$ | $d_{24} = 5.1000$ | $n_{012} = 1.54771$ | $\nu_{012} = 62.83$ |
| $r_{25} = \infty$ | $d_{25} = 1.2100$ | | |
| $r_{26} = \infty$ | $d_{26} = 0.6000$ | $n_{013} = 1.48749$ | $\nu_{013} = 70.20$ |
| $r_{27} = \infty$ | | | |

| f | 9.27 | 22.20 | 52.36 |
|---|---|---|---|
| $D_1$ | 1.000 | 12.531 | 19.568 |

-continued

Embodiment 3

| | | | |
|---|---|---|---|
| $D_2$ | 16.273 | 1.000 | 0.803 |
| $D_3$ | 4.108 | 7.850 | 1.011 | graded refractive index lens

| | $n_0$ | $n_1$ |
|---|---|---|
| d line | 1.69680 | $-0.24792 \times 10^{-3}$ |
| C line | 1.69297 | $-0.61980 \times 10^{-4}$ |
| F line | 1.70552 | $-0.68178 \times 10^{-3}$ |

| | $n_2$ |
|---|---|
| d line | $-0.14107 \times 10^{-4}$ |
| C line | $-0.14001 \times 10^{-4}$ |
| F line | $-0.14354 \times 10^{-4}$ |

$\phi_M/\phi_H = -0.053$, $\phi_G/\phi_n = 0.196$, $\nu^1_d = 0.4$

Embodiment 4

$f = 9.27 \sim 52.36$ mm, F/2.9
$2\omega = 50.58° \sim 8.90°$

| $r_1 = 64.2536$ | $d_1 = 1.0000$ | $n_{01} = 1.84666$ | $\nu_{01} = 23.78$ |
|---|---|---|---|
| $r_2 = 29.4865$ | $d_2 = 0.2009$ | | |
| $r_3 = 28.8861$ | $d_3 = 4.0197$ | $n_{02} = 1.77250$ | $\nu_{02} = 49.66$ |
| $r_4 = -540.9310$ | $d_4 = 0.1500$ | | |
| $r_5 = 28.5502$ | $d_5 = 2.5294$ | $n_{03} = 1.69680$ | $\nu_{03} = 55.52$ |
| $r_6 = 59.3789$ | $d_6 = D_1$ (variable) | | |
| $r_7 = 32.8176$ | $d_7 = 1.0000$ | $n_{04} = 1.74100$ | $\nu_{04} = 52.68$ |
| $r_8 = 10.7269$ | $d_8 = 2.1000$ | | |
| $r_9 = -14.1161$ | $d_9 = 2.0020$ | $n_{05}$ (graded refractive index lens) | |
| $r_{10} = 15.7201$ | $d_{10} = D_2$ (variable) | | |
| $r_{11} = 39.0776$ | $d_{11} = 1.7004$ | $n_{06} = 1.85026$ | $\nu_{06} = 32.28$ |
| $r_{12} = -41.6630$ | $d_{12} = D_3$ (variable) | | |
| $r_{13} = \infty$ (stop) | $d_{13} = 0.2698$ | | |
| $r_{14} = 11.7901$ | $d_{14} = 1.7829$ | $n_{07} = 1.77250$ | $\nu_{07} = 49.66$ |
| $r_{15} = 60.4302$ | $d_{15} = 3.9457$ | | |
| $r_{16} = 26.4126$ | $d_{16} = 1.7380$ | $n_{08} = 1.77250$ | $\nu_{08} = 49.66$ |
| $r_{17} = -12.6041$ | $d_{17} = 0.5000$ | | |
| $r_{18} = -9.4095$ | $d_{18} = 0.8077$ | $n_{09} = 1.84666$ | $\nu_{09} = 23.78$ |
| $r_{19} = 73.5786$ | $d_{19} = 8.6518$ | | |
| $r_{20} = 15.9219$ | $d_{20} = 0.8007$ | $n_{010} = 1.79952$ | $\nu_{010} = 42.24$ |
| $r_{21} = 7.8693$ | $d_{21} = 1.5016$ | | |
| $r_{22} = 10.5189$ | $d_{22} = 1.9077$ | $n_{011} = 1.78590$ | $\nu_{011} = 44.18$ |
| $r_{23} = -62.6702$ | $d_{23} = 5.0000$ | | |
| $r_{24} = \infty$ | $d_{24} = 5.1000$ | $n_{012} = 1.54771$ | $\nu_{012} = 62.83$ |
| $r_{25} = \infty$ | $d_{25} = 1.2100$ | | |
| $r_{26} = \infty$ | $d_{26} = 0.6000$ | $n_{013} = 1.48749$ | $\nu_{013} = 70.20$ |
| $r_{27} = \infty$ | | | |

| f | 9.27 | 22.20 | 52.36 |
|---|---|---|---|
| $D_1$ | 0.757 | 12.423 | 20.229 |
| $D_2$ | 0.764 | 3.019 | 0.938 |
| $D_3$ | 21.350 | 7.430 | 1.704 | graded refractive index lens

| | $n_0$ | $n_1$ |
|---|---|---|
| d line | 1.78590 | $-0.13217 \times 10^{-2}$ |
| C line | 1.78059 | $-0.12776 \times 10^{-2}$ |
| F line | 1.79837 | $-0.14244 \times 10^{-2}$ |

| | $n_2$ |
|---|---|
| d line | $-0.52999 \times 10^{-6}$ |
| C line | $-0.51401 \times 10^{-6}$ |
| F line | $-0.56700 \times 10^{-6}$ |

$\phi_M/\phi_H = -0.046$, $\phi_G/\phi_n = 0.644$

Embodiment 5

$f = 9.27 \sim 52.36$ mm, F/2.9
$2\omega = 50.94° \sim 8.76°$

| $r_1 = 69.7970$ | $d_1 = 1.0000$ | $n_{01} = 1.84666$ | $\nu_{01} = 23.78$ |
|---|---|---|---|
| $r_2 = 29.9133$ | $d_2 = 0.2330$ | | |
| $r_3 = 26.2837$ | $d_3 = 4.2000$ | $n_{02} = 1.77250$ | $\nu_{02} = 49.66$ |
| $r_4 = -382.4272$ | $d_4 = 0.1500$ | | |
| $r_5 = 24.3713$ | $d_5 = 2.8000$ | $n_{03} = 1.74100$ | $\nu_{03} = 52.68$ |
| $r_6 = 45.7028$ | $d_6 = D_1$ (variable) | | |
| $r_7 = 29.9559$ | $d_7 = 1.0358$ | $n_{04} = 1.77250$ | $\nu_{04} = 49.66$ |
| $r_8 = 9.5948$ | $d_8 = 2.1000$ | | |
| $r_9 = -12.8032$ | $d_9 = 1.0000$ | $n_{05}$ (graded refractive index lens) | |
| $r_{10} = 28.7656$ | $d_{10} = D_2$ (variable) | | |
| $r_{11} = 35.3430$ | $d_{11} = 2.0000$ | $n_{06} = 1.84666$ | $\nu_{06} = 23.78$ |
| $r_{12} = -119.6034$ | $d_{12} = D_3$ (variable) | | |
| $r_{13} = \infty$ (stop) | $d_{13} = 0.3091$ | | |
| $r_{14} = 17.2712$ | $d_{14} = 1.8500$ | $n_{07} = 1.77250$ | $\nu_{07} = 49.66$ |
| $r_{15} = -53.0379$ | $d_{15} = 0.2678$ | | |
| $r_{16} = 26.8789$ | $d_{16} = 1.8000$ | $n_{08} = 1.77250$ | $\nu_{08} = 49.66$ |
| $r_{17} = -19.4678$ | $d_{17} = 0.5000$ | | |
| $r_{18} = -14.0660$ | $d_{18} = 1.2104$ | $n_{09} = 1.84666$ | $\nu_{09} = 23.78$ |
| $r_{19} = 61.3878$ | $d_{19} = 5.8557$ | | |
| $r_{20} = 16.5960$ | $d_{20} = 0.8201$ | $n_{010} = 1.80440$ | $\nu_{010} = 39.58$ |
| $r_{21} = 8.3983$ | $d_{21} = 1.1971$ | | |
| $r_{22} = 17.0922$ | $d_{22} = 2.0000$ | $n_{011} = 1.77250$ | $\nu_{011} = 49.66$ |
| $r_{23} = -32.3286$ | $d_{23} = 5.0000$ | | |
| $r_{24} = \infty$ | $d_{24} = 5.1000$ | $n_{012} = 1.54771$ | $\nu_{012} = 62.83$ |
| $r_{25} = \infty$ | $d_{25} = 1.2100$ | | |
| $r_{26} = \infty$ | $d_{26} = 0.6000$ | $n_{013} = 1.48749$ | $\nu_{013} = 70.20$ |
| $r_{27} = \infty$ | | | |

| f | 9.27 | 22.20 | 52.36 |
|---|---|---|---|
| $D_1$ | 0.888 | 12.672 | 19.330 |
| $D_2$ | 5.321 | 5.841 | 0.410 |
| $D_3$ | 14.542 | 2.238 | 1.011 | graded refractive index lens

| | $n_0$ | $n_1$ |
|---|---|---|
| d line | 1.69680 | $-0.19193 \times 10^{-4}$ |
| C line | 1.69297 | $-0.47982 \times 10^{-5}$ |
| F line | 1.70552 | $-0.52781 \times 10^{-4}$ |

| | $n_2$ |
|---|---|
| d line | $-0.83623 \times 10^{-5}$ |
| C line | $-0.82996 \times 10^{-5}$ |
| F line | $-0.85086 \times 10^{-5}$ |

$\phi_M/\phi_H = -0.486 \times 10^{-3}$, $\phi_G/\phi_n = 0.560$

Embodiment 6

$f = 36.2 \sim 101.15$ mm, F/4.65 $\sim$ F/6.73

| $r_1 = 71.2967$ | $d_1 = 1.1011$ | $n_{01} = 1.83481$ | $\nu_{01} = 42.72$ |
|---|---|---|---|
| $r_2 = 17.2869$ | $d_2 = 3.2000$ | $n_{02} = 1.69680$ | $\nu_{02} = 56.49$ |
| $r_3 = 56.6539$ | $d_3 = 0.6725$ | | |
| $r_4 = 17.6783$ | $d_4 = 3.0230$ | $n_{03} = 1.61700$ | $\nu_{03} = 62.79$ |
| $r_5 = 41.2464$ | $d_5 = D_1$ (variable) | | |
| $r_6 = -18.0245$ | $d_6 = 1.1242$ | $n_{04} = 1.77250$ | $\nu_{04} = 49.66$ |
| $r_7 = -64.6503$ | $d_7 = 0.1629$ | | |
| $r_8 = 24.8362$ | $d_8 = 1.3483$ | $n_{05} = 1.84666$ | $\nu_{05} = 23.78$ |
| $r_9 = 32.7567$ | $d_9 = 0.9273$ | | |
| $r_{10} = \infty$ (stop) | $d_{10} = 1.5166$ | | |
| $r_{11} = 22.2897$ | $d_{11} = 2.3850$ | $n_{06} = 1.56016$ | $\nu_{06} = 60.30$ |
| $r_{12} = -29.7301$ (aspherical surface) | $d_{12} = 0.7199$ | | |
| $r_{13} = -19.9710$ | $d_{13} = 4.1185$ | $n_{07}$ (graded refractive index lens 1) | |

-continued

Embodiment 6
$f = 36.2 \sim 101.15$ mm, F/4.65~F/6.73

| | | | |
|---|---|---|---|
| $r_{14} = -14.5467$ | | | |
| | $d_{14} = D_2$ (variable) | | |
| $r_{15} = -49.6669$ | | | |
| | $d_{15} = 2.9985$ | $n_{08}$ (graded refractive index lens 2) | |
| $r_{16} = -60.3853$ | | | |
| | $d_{16} = 4.4609$ | | |
| $r_{17} = -11.8362$ | | | |
| | $d_{17} = 1.6798$ | $n_{09} = 1.77250$ | $\nu_{09} = 49.66$ |
| $r_{18} = -30.1955$ | | | |
| | $d_{18} = 1.0251$ | | |
| $r_{19} = -81.7818$ | | | |
| | $d_{19} = 2.4334$ | $n_{010} = 1.74100$ | $\nu_{010} = 52.68$ |
| $r_{20} = -686.9222$ | | | | aspherical coefficient
$P = 1$
$A_4 = 0.31483 \times 10^{-6}$, $A_6 = -0.10516 \times 10^{-6}$
$A_8 = 0.25200 \times 10^{-8}$

| f | 36.2 | 60.5 | 101.15 |
|---|---|---|---|
| $D_1$ | 2.806 | 11.756 | 15.823 |
| $D_2$ | 7.298 | 3.718 | 1.200 | graded refractive index lens 1

| | $n_0$ | $n_1$ |
|---|---|---|
| d line | 1.77250 | $-0.41885 \times 10^{-3}$ |
| C line | 1.76780 | $-0.44378 \times 10^{-3}$ |
| F line | 1.78337 | $-0.36069 \times 10^{-3}$ |

| | $n_2$ | $n_3$ |
|---|---|---|
| d line | $0.19680 \times 10^{-4}$ | $0.71278 \times 10^{-7}$ |
| C line | $0.19650 \times 10^{-4}$ | $0.69091 \times 10^{-7}$ |
| F line | $0.19749 \times 10^{-4}$ | $0.76381 \times 10^{-7}$ | graded refractive index lens 2

| | $n_0$ | $n_1$ |
|---|---|---|
| d line | 1.78472 | $0.17114 \times 10^{-2}$ |
| C line | 1.77596 | $0.17416 \times 10^{-2}$ |
| F line | 1.80648 | $0.16409 \times 10^{-2}$ |

| | $n_2$ | $n_3$ |
|---|---|---|
| d line | $-0.18026 \times 10^{-4}$ | $0.11881 \times 10^{-7}$ |
| C line | $-0.18377 \times 10^{-4}$ | $0.15564 \times 10^{-7}$ |
| F line | $-0.17208 \times 10^{-4}$ | $0.32878 \times 10^{-8}$ |

$1/\{(f_w)^2 \cdot n_{1d} \cdot \nu_{1d}\} = -2.6233 \times 10^{-2}$
$|\nu_{1d}| = 16.997$, $f_n/f_T = -0.1550$
$B_w/Z = 0.4943$, $n_{1d} \cdot (f_w)^2 = 2.2427$

Embodiment 7
$f = 36.2 \sim 101.14$ mm, F/4.65~F/6.73

| | | | |
|---|---|---|---|
| $r_1 = 48.7977$ | | | |
| | $d_1 = 1.3643$ | $n_{01} = 1.83481$ | $\nu_{01} = 42.72$ |
| $r_2 = 18.1719$ | | | |
| | $d_2 = 3.4000$ | $n_{02} = 1.65160$ | $\nu_{02} = 58.52$ |
| $r_3 = 49.7203$ | | | |
| | $d_3 = 0.1612$ | | |
| $r_4 = 18.3552$ | | | |
| | $d_4 = 3.0325$ | $n_{03} = 1.56873$ | $\nu_{03} = 63.16$ |
| $r_5 = 49.0742$ | | | |
| | $d_5 = D_1$ (variable) | | |
| $r_6 = -21.1415$ | | | |
| | $d_6 = 1.0043$ | $n_{04} = 1.77250$ | $\nu_{04} = 49.66$ |
| $r_7 = -135.7722$ | | | |
| | $d_7 = 0.7149$ | | |
| $r_8 = 43.2708$ | | | |
| | $d_8 = 1.2000$ | $n_{05} = 1.84666$ | $\nu_{05} = 23.78$ |
| $r_9 = 274.2955$ | | | |
| | $d_9 = 0.7877$ | | |
| $r_{10} = \infty$ (stop) | | | |
| | $d_{10} = 1.6827$ | | |
| $r_{11} = 45.9782$ | | | |
| | $d_{11} = 2.0003$ | $n_{06} = 1.56016$ | $\nu_{06} = 60.30$ |
| $r_{12} = -27.8406$ (aspherical surface) | | | |
| | $d_{12} = 0.7085$ | | |

-continued

Embodiment 7
$f = 36.2 \sim 101.14$ mm, F/4.65~F/6.73

| | | | |
|---|---|---|---|
| $r_{13} = -18.0613$ | | | |
| | $d_{13} = 4.5446$ | $n_{07}$ (graded refractive index lens 1) | |
| $r_{14} = -14.4703$ | | | |
| | $d_{14} = D_2$ (variable) | | |
| $r_{15} = -219.7265$ | | | |
| | $d_{15} = 3.1676$ | $n_{08}$ (graded refractive index lens 2) | |
| $r_{16} = -339.1042$ | | | |
| | $d_{16} = 4.6823$ | | |
| $r_{17} = -12.8823$ | | | |
| | $d_{17} = 1.8007$ | $n_{09} = 1.77250$ | $\nu_{09} = 49.66$ |
| $r_{18} = -40.5586$ | | | | aspherical coefficient
$P = 1$
$A_4 = 0.63614 \times 10^{-4}$, $A_6 = 0.57094 \times 10^{-6}$
$A_8 = -0.43557 \times 10^{-8}$, $A_{10} = 0.40901 \times 10^{-10}$

| f | 36.2 | 60.5 | 101.14 |
|---|---|---|---|
| $D_1$ | 2.806 | 13.521 | 17.534 |
| $D_2$ | 9.943 | 4.871 | 1.200 | graded refractive index lens 1

| | $n_0$ | $n_1$ |
|---|---|---|
| d line | 1.77250 | $-0.24592 \times 10^{-3}$ |
| C line | 1.76780 | $-0.28425 \times 10^{-3}$ |
| F line | 1.78336 | $-0.15649 \times 10^{-3}$ |

| | $n_2$ | $n_3$ |
|---|---|---|
| d line | $0.42195 \times 10^{-5}$ | $-0.62409 \times 10^{-8}$ |
| C line | $0.42311 \times 10^{-5}$ | $-0.71455 \times 10^{-8}$ |
| F line | $0.41925 \times 10^{-5}$ | $-0.41301 \times 10^{-8}$ | graded refractive index lens 2

| | $n_0$ | $n_1$ |
|---|---|---|
| d line | 1.78472 | $0.16482 \times 10^{-2}$ |
| C line | 1.77596 | $0.16881 \times 10^{-2}$ |
| F line | 1.80649 | $0.15551 \times 10^{-2}$ |

| | $n_2$ | $n_3$ |
|---|---|---|
| d line | $-0.95660 \times 10^{-5}$ | $-0.15590 \times 10^{-7}$ |
| C line | $-0.96870 \times 10^{-5}$ | $-0.15053 \times 10^{-7}$ |
| F line | $-0.92837 \times 10^{-5}$ | $-0.16842 \times 10^{-7}$ |

$1/\{(f_w)^2 \cdot n_{1d} \cdot \nu_{1d}\} = -3.7356 \times 10^{-2}$
$|\nu_{1d}| = 12.395$, $f_n/f_T = -0.1829$
$B_w/Z = 0.4944$, $n_{1d} \cdot (f_w)^2 = 2.1597$

Embodiment 8
$f = 36.2 \sim 101.15$ mm, F/4.65~F/6.73

| | | | |
|---|---|---|---|
| $r_1 = 50.5219$ | | | |
| | $d_1 = 1.0763$ | $n_{01} = 1.83481$ | $\nu_{01} = 42.72$ |
| $r_2 = 19.5967$ | | | |
| | $d_2 = 2.5678$ | $n_{02} = 1.69680$ | $\nu_{02} = 55.52$ |
| $r_3 = 50.6890$ | | | |
| | $d_3 = 0.1200$ | | |
| $r_4 = 14.7278$ | | | |
| | $d_4 = 2.5002$ | $n_{03} = 1.61700$ | $\nu_{03} = 62.79$ |
| $r_5 = 30.3624$ | | | |
| | $d_5 = D_1$ (variable) | | |
| $r_6 = -19.7109$ | | | |
| | $d_6 = 1.3591$ | $n_{04} = 1.76200$ | $\nu_{04} = 40.10$ |
| $r_7 = 297.8886$ | | | |
| | $d_7 = 0.1500$ | | |
| $r_8 = 29.5656$ | | | |
| | $d_8 = 3.5728$ | $n_{05} = 1.65160$ | $\nu_{05} = 58.52$ |
| $r_9 = -21.2386$ | | | |
| | $d_9 = D_2$ (variable) | | |
| $r_{10} = \infty$ (stop) | | | |
| | $d_{10} = 1.5728$ | | |
| $r_{11} = -15.3925$ | | | |
| | $d_{11} = 1.7490$ | $n_{06} = 1.76200$ | $\nu_{06} = 40.10$ |
| $r_{12} = -35.6443$ | | | |
| | $d_{12} = 0.8757$ | | |
| $r_{13} = 51.8051$ | | | |

-continued

Embodiment 8
f = 36.2~101.15 mm, F/4.65~F/6.73

| | | | |
|---|---|---|---|
| | $d_{13} = 3.6074$ | $n_{07} = 1.61700$ | $\nu_{07} = 62.79$ |
| $r_{14} = -17.8806$ (aspherical surface) | | | |
| | $d_{14} = D_3$ (variable) | | |
| $r_{15} = -21.0167$ | | | |
| | $d_{15} = 1.0001$ | $n_{08}$ (graded refractive index lens 1) | |
| $r_{16} = -168.1433$ | | | |
| | $d_{16} = 3.8000$ | | |
| $r_{17} = -12.2088$ | | | |
| | $d_{17} = 1.0001$ | $n_{09}$ (graded refractive index lens 2) | |
| $r_{18} = -21.95$ | | | | aspherical coefficient

P = 1
$A_4 = 0.66132 \times 10^{-4}$, $A_6 = 0.41992 \times 10^{-6}$
$A_8 = -0.62935 \times 10^{-8}$

| f | 36.2 | 60.5 | 101.15 |
|---|---|---|---|
| $D_1$ | 2.400 | 5.537 | 8.567 |
| $D_2$ | 0.201 | 1.868 | 2.894 |
| $D_3$ | 10.444 | 5.068 | 1.250 | graded refractive index lens 1

| | $n_0$ | $n_1$ |
|---|---|---|
| d line | 1.74100 | $-0.41486 \times 10^{-3}$ |
| C line | 1.73673 | $-0.31495 \times 10^{-3}$ |
| F line | 1.75080 | $-0.64798 \times 10^{-3}$ |

| | $n_2$ | $n_3$ |
|---|---|---|
| d line | $-0.52540 \times 10^{-5}$ | $0.12416 \times 10^{-7}$ |
| C line | $-0.71599 \times 10^{-5}$ | $0.23638 \times 10^{-7}$ |
| F line | $-0.80700 \times 10^{-6}$ | $-0.13768 \times 10^{-7}$ | graded refractive index lens 2

| | $n_0$ | $n_1$ |
|---|---|---|
| d line | 1.69680 | $-0.42632 \times 10^{-3}$ |
| C line | 1.69297 | $-0.41913 \times 10^{-3}$ |
| F line | 1.70552 | $-0.44309 \times 10^{-3}$ |

| | $n_2$ | $n_3$ |
|---|---|---|
| d line | $-0.49684 \times 10^{-5}$ | $0.28384 \times 10^{-7}$ |
| C line | $-0.52769 \times 10^{-5}$ | $0.30977 \times 10^{-7}$ |
| F line | $-0.42485 \times 10^{-5}$ | $0.22333 \times 10^{-7}$ |

$1/\{(f_w)^2 \cdot n_{1d} \cdot \nu_{1d}\} = -1.4767$ (graded refractive index lens 1)
$1/\{(f_w)^2 \cdot n_{1d} \cdot \nu_{1d}\} = -0.1006$ (graded refractive index lens 2)
$|\nu_{1d}| = 1.2457$ (graded refractive index lens 1)
$|\nu_{1d}| = 17.794$ (graded refractive index lens 2)
$f_n/f_T = -0.1769$, $B_w/Z = 0.4448$
$n_{1d} \cdot (f_w)^2 = -0.5436$ (graded refractive index lens 1)
$n_{1d} \cdot (f_w)^2 = -0.5587$ (graded refractive index lens 2)

Embodiment 9
f = 36.2~101.12 mm, F/4.65~F/6.73

| | | | |
|---|---|---|---|
| $r_1 = 44.8237$ | | | |
| | $d_1 = 1.0763$ | $n_{01} = 1.83481$ | $\nu_{01} = 42.72$ |
| $r_2 = 13.8718$ | | | |
| | $d_2 = 2.7803$ | $n_{02} = 1.69680$ | $\nu_{02} = 55.52$ |
| $r_3 = 39.5808$ | | | |
| | $d_3 = 0.1200$ | | |
| $r_4 = 14.9330$ | | | |
| | $d_4 = 2.6000$ | $n_{03} = 1.61700$ | $\nu_{03} = 62.79$ |
| $r_5 = 53.0050$ | | | |
| | $d_5 = D_1$ (variable) | | |
| $r_6 = -21.7602$ | | | |
| | $d_6 = 0.7633$ | $n_{04} = 1.77250$ | $\nu_{04} = 49.66$ |
| $r_7 = 49.2205$ | | | |
| | $d_7 = 0.1500$ | | |
| $r_8 = 19.9897$ | | | |
| | $d_8 = 1.8119$ | $n_{05} = 1.84666$ | $\nu_{05} = 23.78$ |
| $r_9 = 19.4923$ | | | |
| | $d_9 = 2.5538$ | $n_{06} = 1.61700$ | $\nu_{06} = 62.79$ |
| $r_{10} = -23.5190$ | | | |

Embodiment 9
f = 36.2~101.12 mm, F/4.65~F/6.73

| | | | |
|---|---|---|---|
| $r_{11} = \infty$ (stop) | $d_{10} = D_2$ (variable) | | |
| | $d_{11} = 1.6286$ | | |
| $r_{12} = -17.2394$ | | | |
| | $d_{12} = 1.4808$ | $n_{07} = 1.80610$ | $\nu_{07} = 40.95$ |
| $r_{13} = -63.3648$ | | | |
| | $d_{13} = 0.8359$ | | |
| $r_{14} = 27.3754$ | | | |
| | $d_{14} = 3.6414$ | $n_{08} = 1.60729$ | $\nu_{08} = 59.38$ |
| $r_{15} = -16.9288$ (aspherical surface) | | | |
| | $d_{15} = D_3$ (variable) | | |
| $r_{16} = -14.8390$ | | | |
| | $d_{16} = 1.1025$ | $n_{09}$ (graded refractive index lens) | |
| $r_{17} = -40.8072$ | | | |
| | $d_{17} = 3.7060$ | | |
| $r_{18} = -11.8238$ | | | |
| | $d_{18} = 1.1064$ | $n_{010} = 1.77250$ | $\nu_{010} = 49.66$ |
| $r_{19} = -28.6253$ | | | | aspherical coefficient

P = 1
$A_4 = 0.10683 \times 10^{-3}$, $A_6 = 0.83640 \times 10^{-7}$
$A_8 = 0.30357 \times 10^{-8}$

| f | 36.2 | 60.5 | 101.12 |
|---|---|---|---|
| $D_1$ | 2.303 | 3.881 | 8.783 |
| $D_2$ | 0.201 | 2.421 | 2.940 |
| $D_3$ | 9.527 | 4.987 | 1.392 | graded refractive index lens

| | $n_0$ | $n_1$ |
|---|---|---|
| d line | 1.69895 | $-0.24603 \times 10^{-2}$ |
| C line | 1.69223 | $-0.22776 \times 10^{-2}$ |
| F line | 1.71543 | $-0.28865 \times 10^{-2}$ |

| | $n_2$ | $n_3$ |
|---|---|---|
| d line | $-0.15455 \times 10^{-5}$ | $-0.57306 \times 10^{-8}$ |
| C line | $-0.47227 \times 10^{-5}$ | $0.17074 \times 10^{-7}$ |
| F line | $0.58680 \times 10^{-5}$ | $-0.58942 \times 10^{-7}$ |

$1/\{(f_w)^2 \cdot n_{1d} \cdot \nu_{1d}\} = -7.6762 \times 10^{-2}$
$|\nu_{1d}| = 4.0408$, $f_n/f_T = -0.1517$
$B_w/Z = 0.4390$, $n_{1d} \cdot (f_w)^2 = -3.2239$

Embodiment 10
f = 36.2~101.15 mm, F/4.65~F/6.73

| | | | |
|---|---|---|---|
| $r_1 = 75.8983$ | | | |
| | $d_1 = 1.0763$ | $n_{01} = 1.83481$ | $\nu_{01} = 42.72$ |
| $r_2 = 15.3667$ | | | |
| | $d_2 = 3.0209$ | $n_{02} = 1.69680$ | $\nu_{02} = 56.49$ |
| $r_3 = 44.2457$ | | | |
| | $d_3 = 0.1200$ | | |
| $r_4 = 12.9571$ (aspherical surface) | | | |
| | $d_4 = 2.6237$ | $n_{03} = 1.61700$ | $\nu_{03} = 62.79$ |
| $r_5 = 49.7031$ | | | |
| | $d_5 = D_1$ (variable) | | |
| $r_6 = -19.2240$ | | | |
| | $d_6 = 0.8010$ | $n_{04} = 1.77250$ | $\nu_{04} = 49.66$ |
| $r_7 = 97.2859$ | | | |
| | $d_7 = 0.2045$ | | |
| $r_8 = 25.0180$ | | | |
| | $d_8 = 1.2000$ | $n_{05} = 1.84666$ | $\nu_{05} = 23.78$ |
| $r_9 = 21.9566$ | | | |
| | $d_9 = 0.1200$ | | |
| $r_{10} = 14.5899$ | | | |
| | $d_{10} = 1.8000$ | $n_{06} = 1.56384$ | $\nu_{06} = 60.69$ |
| $r_{11} = -47.5697$ | | | |
| | $d_{11} = 0.4372$ | | |
| $r_{12} = \infty$ (stop) | | | |
| | $d_{12} = 1.2928$ | | |
| $r_{13} = -63.4292$ | | | |
| | $d_{13} = 1.2000$ | $n_{07} = 1.80610$ | $\nu_{07} = 40.95$ |
| $r_{14} = -46.5385$ | | | |
| | $d_{14} = 0.7321$ | | |

-continued

Embodiment 10
f = 36.2 ~ 101.15 mm. F/4.65 ~ F/6.73

| | | |
|---|---|---|
| $r_{15} = 141.8156$ | | |
| | $d_{15} = 2.8604$ | $n_{08}$ (graded refractive index lens 1) |
| $r_{16} = -23.9114$ | | |
| | $d_{16} = D_2$ (variable) | |
| $r_{17} = -13.6068$ | | |
| | $d_{17} = 1.2521$ | $n_{09}$ (graded refractive index lens 2) |
| $r_{18} = -50.9149$ | | |
| | $d_{18} = 4.0284$ | |
| $r_{19} = -11.5646$ | | |
| | $d_{19} = 1.2522$ | $n_{010} = 1.77250$   $\nu_{010} = 49.66$ |
| $r_{20} = -20.6898$ | | | aspherical coefficient

P = 1
$A_4 = -0.11836 \times 10^{-4}$, $A_6 = -0.13779 \times 10^{-7}$
$A_8 = -0.68096 \times 10^{-9}$

| f | 36.2 | 60.5 | 101.15 |
|---|---|---|---|
| $D_1$ | 2.371 | 8.215 | 11.349 |
| $D_2$ | 8.608 | 4.106 | 1.001 | graded refractive index lens 1

| | $n_0$ | $n_1$ |
|---|---|---|
| d line | 1.60311 | $0.27450 \times 10^{-4}$ |
| C line | 1.60008 | $0.27547 \times 10^{-4}$ |
| F line | 1.61002 | $0.27224 \times 10^{-4}$ |

| | $n_2$ | $n_3$ |
|---|---|---|
| d line | $0.26422 \times 10^{-4}$ | $0.61383 \times 10^{-6}$ |
| C line | $0.25920 \times 10^{-4}$ | $0.60210 \times 10^{-6}$ |
| F line | $0.27593 \times 10^{-4}$ | $0.64121 \times 10^{-6}$ | graded refractive index lens 2

| | $n_0$ | $n_1$ |
|---|---|---|
| d line | 1.69680 | $-0.15538 \times 10^{-2}$ |
| C line | 1.69297 | $-0.14799 \times 10^{-2}$ |
| F line | 1.70552 | $-0.17262 \times 10^{-2}$ |

| | $n_2$ | $n_3$ |
|---|---|---|
| d line | $-0.10118 \times 10^{-4}$ | $0.31305 \times 10^{-7}$ |
| C line | $-0.10798 \times 10^{-4}$ | $0.33331 \times 10^{-7}$ |
| F line | $-0.85303 \times 10^{-5}$ | $0.26578 \times 10^{-7}$ |

$1/\{(f_w)^2 \cdot n_{1d} \cdot \nu_{1d}\} = -7.7862 \times 10^{-2}$
$|\nu_{1d}| = 6.3077$, $f_n/f_T = -0.1531$
$B_w/Z = 0.4152$, $n_{1d} \cdot (f_w)^2 = -2.0361$ wherein the reference symbols $r_1, r_2, \ldots$ represent radii of curvature on the surfaces of the respective lens elements, the reference symbols $d_1, d_2, \ldots$ designate thicknesses of the respective lens elements and the airspaces reserved therebetween, the reference symbols $n_1, n_2, \ldots$ denote refractive indices of the respective lens elements, and the reference symbols $\nu_1, \nu_2, \ldots$ represent Abbe's numbers of the respective lens elements.

As is understood from the foregoing description, the present invention provides a compact and high performance vari-focal lens system which can correct chromatic aberration without using lens elements having refractive powers of different signs, unlike the conventional vari-focal lens systems composed only of homogenous lens elements, by using at least one radial GRIN lens having refractive indices distributed from the high refractive index-high dispersion region to the low refractive index-low dispersion region or low refractive index-low dispersion region to the high refractive index-high dispersion region as traced on the $n_d - \nu_d$ graph, and adequately selecting shape and refractive index distribution profile for the GRIN lens.

Further, the present invention enables to further shorten the total length of the vari-focal lens system by arranging a lens unit which has a negative refractive power and is composed only of lens elements having negative refractive powers on the extremely image side in the lens unit, and adopting at least one radial GRIN lens in said lens unit.

I claim:

1. A vari-focal lens system comprising a plurality of lens units separated from one another by airspaces interposed therebetween and including at least one lens unit having a positive refractive power and at least one lens having a negative refractive power, said lens system varying the focal length thereof by varying the airspace between said lens unit having the positive refractive power and said lens unit having the negative refractive power;

wherein a lens unit disposed on the extreme image side in said lens system has a negative refractive power, said lens unit disposed on the extreme image side including a plurality of lens elements having negative refractive powers with at least one of said lens elements being a graded refractive index lens having a refractive index distribution in a direction perpendicular to an optical axis of said lens system.

2. A vari-focal lens system according to claim 1 wherein said graded refractive index lens satisfies the following condition:

$$n(r) = n_0 + n_1 r^2 + n_2 r^4 + n_3 r^6 + \ldots$$

wherein the reference symbol $n_0$ represents refractive index of the graded refractive index lens as measured on the optical axis, the reference symbol r designates the distance as measured in the radial direction from the optical axis, the reference symbol $n(r)$ denotes the refractive index of the graded refractive index lens as measured at a point located at the radial distance of r from the optical axis, and the reference symbols $n_1$, $n_2$, $n_3$, ... represent the refractive index distribution coefficients of the second, fourth and sixth orders respectively.

3. A vari-focal lens system according to claim 2 satisfying the following condition (3):

$$\frac{1}{(f_w)^2 \cdot n_{1d} \cdot \nu_{1d}} < 0 \tag{3}$$

wherein the reference symbol $f_w$ represents the focal length of the vari-focal lens system as a whole at the wide position thereof, the reference symbol $n_{1d}$ designates the distribution coefficient of the second order of the graded refractive index lens for the d-line and $\nu_{1d}$ denotes the value culculated by the following formula from the coefficients of $n_{1d}$, $n_{1F}$ and $n_{1C}$ of the second order for the d-line, F-line and C-line respectively:

$$\nu_{1d} = n_{1d}/(n_{1F} - n_{1C})$$

4. A vari-focal lens system according to claim 2 satisfying the following condition (4):

(4) $|\nu_{1d}| < 50$ wherein the $\nu_{1d}$ represents the value calculated by the following formula from the coefficients of $n_{1d}$, $n_{1F}$ and $n_{1C}$ of the second order for the d-line, F-line and C-line respectively:

$$\nu_{1d} = n_{1d}/(n_{1F} - n_{1C})$$

5. A vari-focal lens system according to claim 2 or 17 satisfying the following conditions (5) and (6):

(5) $-0.4 < f_n/f_T < -0.05$ (6) $0.2 < B_w/Z < 0.7$ wherein the reference symbol $f_n$ represents the focal length of the negative lens unit arranged on the extremely image side, the reference symbol $f_T$ designates the focal length of the vari-focal lens system as a whole at the tele position thereof, the reference symbol $B_w$ denotes the telephoto ratio at the wide position and the reference symbol Z represents the vari-focal ratio of the lens system.

6. A vari-focal lens system according to claim 2 satisfying the following condition (3'):

$$-20 < \frac{1}{(f_w)^2 \cdot n_{1d} \cdot \nu_{1d}} < 0 \qquad (3')$$

wherein the reference symbol $f_w$ represents the focal length of the vari-focal lens system as a whole at the wide position thereof, the reference symbol $n_{1d}$ designates the distribution coefficient of the second order of the graded refractive index lens for the d-line and $\nu_{1d}$ denotes the value calculated by the following formula from the coefficients of $n_{1d}$, $n_{1F}$ and $n_{1C}$ of the second order for the d-line, F-line and C-line respectively:

$$\nu_{1d} = n_{1d}/(n_{1F} - n_{1C})$$

7. A vari-focal lens system according to claim 4 wherein said plurality of lens units are a first lens unit having a positive refractive power, a second lens unit having a positive refractive power and a third lens unit having a negative refractive power arranged in the order from the object side, and said third lens unit comprises said graded refractive index lens.

8. A vari-focal lens system according to claim 7 wherein said third lens unit is composed of two lens elements having negative refractive powers.

9. A vari-focal lens system according to claim 7 wherein said graded refractive index lens satisfies the following condition (9):

(9) $0 < n_{1d}(f_w)^2 < 15$ wherein the reference symbol $n_{1d}$ represents the distribution coefficient of the seocnd order of the graded refractive index lens for the d-line and the reference symbol $f_w$ designates the focal length of the vari-focal lens system as a whole at the wide position.

10. A vari-focal lens system according to claim 7, 8 or 9 wherein said second lens unit comprises another graded refractive index lens.

11. A vari-focal lens system according to claim 4 wherein said plurality of lens units are a first lens unit having a positive refractive power, a second lens unit having a positive refractive power, a third lens unit having a positive refractive power and a fourth lens unit having a negative refractive power arranged in the order from the object side, and said fourth lens unit comprises said graded refractive index lens.

12. A vari-focal lens system according to claim 11 satisfying the following condition (7):

(7) $-15 < n_{1d}(f_w)^2 < 0.0$ wherein the reference symbol $n_{1d}$ represents the distribution coefficient of the second order of the graded refractive index lens for the d-line and the reference symbol $f_w$ designates the focal length of the vari-foal lens system as a whole at the wide position.

13. A vari-focal lens system according to claim 12 wherein said third lens unit comprises a lens element having an aspherical surface having such a shape as to weaken positive refractive power as the surface portions are farther from the optical axis.

14. A vari-focal lens system according to claim 8 satisfying the following condition (7):

(7) $-15 < n_{1d}(f_w)^2 < 0.0$ wherein the reference symbol $n_{1d}$ represents the distribution coefficient of the second order of the graded refractive index lens for the d-line and the reference symbol $f_w$ designates the focal length of the vari-focal lens system as a whole at the wide position.

15. A vari-focal lens system according to claim 14 wherein said second lens unit comprises said graded refractive index lens.

16. A vari-focal lens system according to claim 15 wherein said first lens unit comprises a lens element having an aspherical surface having such a shape as to weaken positive refractive power as the surface portions are farther from the optical axis.

17. A compact zoom lens system having a high vari-focal ratio comprising at least three lens units including a lens unit having a positive refractive power and a second lens unit having a negative refractive power, the zoom lens system performing variation of focal length by varying at least two airspaces between the three lens units;

a lens unit disposed on an extreme object side of said zoom lens system having a positive refractive power;

said second lens unit comprising at least one graded refractive index lens element having a refractive index distribution in the direction perpendicular to an optical axis of the zoom lens system;

said zoom lens system satisfying the following conditions (1) and (2):

(1) $-1.0 < \phi_M/\phi_H < 0$ (2) $0 < \phi_G/\phi_n < 1.0$ wherein the reference symbol $\phi_M$ represents the refractive power of the medium of said graded refractive index lens element, the reference symbol $\phi_H$ designates the refractive power of a homogenous lens element having the refractive index lens element as measured on said optical axis, the reference symbol $\phi_G$ denotes the refractive power of the graded refractive index lens element as a whole and the reference symbol $\phi_n$ lens unit as a whole comprising the graded refractive index lens element.

18. A compact zoom lens system having a high vari-focal ratio according to claim 17 satisfying the following condition (3):

(3) $0 < \nu_{1d} < \nu_{0d}$ wherein the reference symbol $\nu_{0d}$ represents the Abbe's number determined from the refractive index of the graded refractive index lens element as measured on said optical axis and the reference symbol $\nu_{1d}$ designates a value calculated by the formula shown below using refractive index distribution coefficients of the second order $n_{1d}$, $n_{1F}$ and $n_{1C}$ for the d-line, F-line and C-line respectively $$\nu_{1d} = n_{1d}/(n_{1F} - n_{1C}).$$

19. A vari-focal lens system according to claim 17 wherein the refractive index distribution of said graded refractive index lens is expressed by the following formula:

$$n(r) = n_0 + n_1 r^2 + n_2 r^4 + n_3 r^6 + \ldots$$

wherein the reference symbol $n_0$ represents refractive index of the graded refractive index lens as measured on the optical axis, the reference symbol r designates the distance as measured in the radial direction from the optical axis, the reference symbol n(r) denotes the refractive index of the graded refractive index lens as measured at a point located at the radial distance of r from the optical axis, and the reference symbols $n_1$, $n_2$, $n_3$, ... represent the refractive index distribution coefficients of the second, fourth and sixth orders respectively.

20. A vari-focal lens system according to claim 17 wherein said at least three lens units are a first lens unit having a positive refractive power, a second lens unit having a positive refractive power, a third lens unit having a positive refractive power and a fourth lens unit having a negative refractive power arranged in the order from the object side, and said fourth lens unit comprises said graded refractive index lens.

21. A vari-focal lens system according to claim 20 wherein said graded refractive index lens satisfies the following condition (7).

(7) $-15 < n_{1d}(f_w)^2 < 0$ wherein the reference symbol $n_{1d}$ represents the distribution coefficient of the second order of the graded refractive index lens for the d-line.

22. A vari-focal lens system according to claim 21 wherein said third lens unit comprises a lens element having an aspherical surface having such a shape as to weaken positive refractive power as the surface portions are farther from the optical axis.

23. A vari-focal lens system according to claim 17 wherein said at least three lens units are a first lens unit having a positive refractive power, a second lens unit having a positive refractive power and a third lens unit having a negative refractive power arranged in the order from the object side, and said third lens unit comprises said graded refractive index lens.

24. A vari-focal lens system according to claim 23 wherein said second lens unit comprises another graded refractive index lens.

25. A vari-focal lens system according to claim 23 wherein said graded refractive index lens comprised in said third lens unit satisfies the following condition (7):

(7) $-15 < n_{1d}(f_w)^2 < 0$ wherein the reference symbol $n_{1d}$ represents the distribution coefficient of the second order of the graded refractive index lens for the d-line.

26. A vari-focal lens system according to claim 24 wherein said first lens unit comprises a lens element having an aspherical surface having such a shape as to weaken positive refractive power as the surface portions are farther from the optical axis.

27. A vari-focal lens system according to claim 17 wherein said at least three lens units are a first lens unit having a positive refractive power, a second lens unit having a negative refractive power, a third lens unit having a negative refractive power and a fourth lens unit having a positive refractive power arranged in the order from the object side, and said second lens unit comprises said graded refractive index lens.

28. A vari-focal lens system according to claim 27 wherein said graded refractive index lens satisfies the following condition (4):

(4) $0 < v_{1d} < 50$ wherein the reference symbol $v_{1d}$ represents the value calculated by the following formula from the coefficients of $n_{1d}$, $n_{1F}$ and $n_{1C}$ of the second order for the d-line, F-line and C-line respectively:

$$v_{1d} = n_{1d}/(n_{1F} - n_{1C})$$

29. A vari-focal lens system according to claim 17 wherein said at least three lens units are a first lens unit having a positive refractive power, a second lens unit having a negative refractive power, a third lens unit having a positive refractive power and a fourth lens unit having a positive refractive power, and said second lens unit comprises said graded refractive index lens.

30. A vari-focal lens system according to claim 25, wherein said first lens unit comprises a lens element having an aspherical surface with such a shape so as to weaken positive refractive power as the surface portions thereof become farther from the optical axis.

31. A compact zoom lens system having a high vari-focal ratio comprising at least three lens units including a first lens unit having a positive refractive power and a second lens unit having a negative refractive power, said lens system performing variation of focal length by moving said three lens unit along an optical axis of said lens system;
    wherein a lens unit disposed on an extreme object side of said zoom lens system has a positive refractive power;
    said second lens unit comprising at least one graded refractive index lens element having a refractive index distribution in a direction perpendicular to the optical axis; and
    said zoom lens system satisfying the following conditions (1) and (2):
    (1) $-1.0 < \phi_M/\phi_H < 0$
    (2) $0 < \phi_G/\phi_n < 1.0$
wherein the reference symbol $\phi_M$ represents the refractive power of the medium of said graded refractive index lens element, the reference symbol $\phi_H$ designates the refractive power of a homogenous lens element having the refractive index equal to that of the graded refractive index lens element as measured on the optical axis, the reference symbol $\phi_G$ denotes the refractive power of the graded refractive index lens element as a whole and the reference symbol $\phi_n$ represents the refractive power of the second lens unit as a whole including the graded refractive index lens element.

32. A compact zoom lens system having a high vari-focal ratio comprising at least three lens units including a first lens unit having a positive refractive power and a second lens unit having a negative refractive power, said lens system performing variation of focal length by varying at least two airspaces interposed between the three lens units;
    wherein a lens unit disposed on an extreme object side in said zoom lens system has a positive refractive power;
    said second lens unit comprising at least one graded refractive index lens element having a refractive index distribution in a direction perpendicular to an optical axis of said lens system, a negative refractive power of a surface thereof and a positive refractive power of a medium from which said graded refractive index lens is made, and said zoom lens system satisfying the following conditions (1) and (2):

(1) $-1.0 < \phi_M/\phi_H < 0$
(2) $0 < \phi_G/\phi_n < 1.0$ wherein the reference symbol $\phi_M$ represents the refractive power of the medium of the graded refractive index lens element, the reference symbol $\phi_H$ designates the refractive power of a homogenous lens element having the refractive index equal to that of said graded refractive index lens element as measured on the optical axis, the reference symbol $\phi_G$ denotes the refractive power of the graded refractive index lens element as a whole and the reference symbol $\phi_n$ represents the refractive power of the second lens unit as a whole including the graded refractive index lens element.

33. A compact zoom lens system having a high varifocal ratio comprising at least three lens units including a first lens unit having a positive refractive power and a second lens unit having a negative refractive power, said lens system performing variation of focal length by varying at least two airspaces interposed between the three lens units;

wherein a lens unit disposed on an extreme object side of said zoom lens system has a positive refractive power and is fixed during variation of focal length;

said second lens unit comprises at least one graded refractive index lens element having a refractive index distribution in a direction perpendicular to an optical axis of said lens system; and said zoom lens system satisfying the following conditions (1) and (2):

(1) $-1.0 < \phi_M/\phi_H < 0$
(2) $0 < \phi_G/\phi_n < 1.0$ wherein the reference symbol $\phi_M$ represents the refractive power of the medium of said graded refractive index lens element, the reference symbol $\phi_H$ designates the refractive power of a homogenous lens element having the refractive index equal to that of the graded refractive index lens element as measured on the optical axis, the reference symbol $\phi_G$ denotes the refractive power of said graded refractive index lens element as a whole, and the reference symbol $\phi_n$ represents the refractive power of the second lens unit as a whole including the graded refractive index lens element.

34. A compact zoom lens system having a high varifocal ratio comprising at least three lens units including a first lens unit having a positive refractive power and a second lens unit having a negative refractive power, said lens system performing variation of focal length by varying at least two airspaces interposed between the three lens units;

wherein a lens unit disposed on an extreme object side of said zoom lens system has a positive refractive power;

said second lens unit comprises at least one graded refractive index lens element having a refractive index distribution in a direction perpendicular to an optical axis of said lens system; and said zoom lens system satisfying the following conditions (1) and (2):

(1) $-1.0 < \phi_M/\phi_H < 0$
(2) $0 < \phi_G/\phi_n < 1.0$ wherein the reference symbol $\phi_M$ represents the refractive power of the medium of said graded refractive index lens element, the reference symbol $\phi_H$ designates the refractive power of a homogenous lens element having the refractive index equal to that of the graded refractive index lens element as measured on the optical axis, the reference symbol $\phi_G$ denotes the refractive power of said graded refractive index lens element as a whole and the reference symbol $\phi_n$ represents the refractive power of the negative lens unit as a whole including the graded refractive index lens element.

* * * * *